(12) United States Patent
Reusch et al.

(10) Patent No.: US 8,832,667 B2
(45) Date of Patent: Sep. 9, 2014

(54) METHOD AND PROGRAMMING TOOL FOR CREATING A USER PROGRAM FOR A SAFETY CONTROLLER

(75) Inventors: Matthias Reusch, Hohenstein (DE); Stefan Woehrle, Ostfildern (DE); Ralf Bauer, Rechberghausen (DE); Matthias Holzaepfel, Stuttgart (DE); Maurice Gilmore, Co Cork (IE)

(73) Assignee: Pilz GmbH & Co. KG, Ostfildern (DE)

( * ) Notice: Subject to any disclaimer, the term of this patent is extended or adjusted under 35 U.S.C. 154(b) by 500 days.

(21) Appl. No.: 13/111,144

(22) Filed: May 19, 2011

(65) Prior Publication Data

US 2012/0004744 A1 Jan. 5, 2012

Related U.S. Application Data

(63) Continuation of application No. PCT/EP2009/008279, filed on Nov. 20, 2009.

(30) Foreign Application Priority Data

Nov. 25, 2008 (DE) .......................... 10 2008 060 003

(51) Int. Cl.
*G06F 9/44* (2006.01)
(52) U.S. Cl.
USPC .......................................................... 717/135
(58) Field of Classification Search
USPC ............ 717/109, 120, 124, 134–135; 700/83, 700/197, 99, 170, 29, 97, 87; 726/2–3; 709/205, 219, 223, 230; 715/234, 734, 715/736, 763; 370/389, 465
See application file for complete search history.

(56) References Cited

U.S. PATENT DOCUMENTS

| | | | |
|---|---|---|---|
| 6,549,034 B1 * | 4/2003 | Pietrzyk et al. ................. | 326/38 |
| 7,139,622 B2 | 11/2006 | Klopfer et al. | |
| 7,861,223 B1 * | 12/2010 | Schmidt et al. ............... | 717/120 |
| 2004/0148037 A1 * | 7/2004 | Frampton et al. ............... | 700/29 |
| 2004/0148130 A1 | 7/2004 | Scott et al. | |
| 2006/0040792 A1 | 2/2006 | Muneta | |
| 2007/0016310 A1 | 1/2007 | Niwa | |
| 2007/0061018 A1 * | 3/2007 | Callaghan et al. ................ | 700/1 |
| 2008/0127065 A1 * | 5/2008 | Bryant et al. ................. | 717/109 |

(Continued)

FOREIGN PATENT DOCUMENTS

| | | |
|---|---|---|
| DE | 198 41 194 A1 | 2/2000 |
| DE | 101 08 962 A1 | 9/2002 |

(Continued)

OTHER PUBLICATIONS

An English language translation of Notification of Reason(s) for Refusal for Japanese Patent Application No. 2011-536786 dated Jul. 4, 2013; 4 pp.

(Continued)

*Primary Examiner* — Tuan A Vu
(74) *Attorney, Agent, or Firm* — Harness, Dickey & Pierce, P.L.C.

(57) ABSTRACT

A new method and to a new programming tool for creating a user program for a safety controller is disclosed. The new method and programming tool exploit a matrix-type organization of occurring programming tasks. Itemized software components allocated to specific hardware components are combined with aspect blocks that enable programming grouped according to functional control aspects of the system to be controlled.

5 Claims, 13 Drawing Sheets

(56) References Cited

U.S. PATENT DOCUMENTS

| | | | |
|---|---|---|---|
| 2008/0140230 A1* | 6/2008 | Bromley | 700/83 |
| 2009/0030534 A1 | 1/2009 | Dold et al. | |
| 2009/0033272 A1* | 2/2009 | Winterhalter et al. | 318/650 |

FOREIGN PATENT DOCUMENTS

| | | |
|---|---|---|
| DE | 10 2004 003 570 A1 | 3/2005 |
| EP | 2 012 201 A1 | 1/2009 |
| JP | 2003-263202 | 9/2003 |
| JP | 2007-011713 | 1/2007 |
| JP | 2007-25736 | 2/2007 |
| JP | 2007-310718 A | 11/2007 |
| JP | 2008-282341 | 11/2008 |

OTHER PUBLICATIONS

IEC 61131-1, Programmable controllers—Part 1: General information, May 2003, 24 pages.

EN ISO 13849-1, Safety of machinery—Safety-related parts of control systems—Part 1: General principles for design, Nov. 2006, 97 pages.

DIN EN 954-1, Safety-related parts of control systems Part 1: General principles for design, Mar. 1997, 34 pages.

CEI IEC 61508-2, Functional safety of electrical/electronic/programmable electronic safety-related systems—Part 2: Requirements for electrical/electronic/programmable electronic safety-related systems, May 2000, 152 pages.

R. Wagner, Software fuer komplexe Automatisierungsaufgaben, 2006/2007, 3 pages.

Excerpt from http://de.wikipedia.org: "Aspektorientierte Programmierung", Oct. 2008, 13 pages.

B. Wagner, Kapitel 6: Verteilte Steuerungen in IEC 61499, 2006, 40 pages.

CoDeSys V3—Quick Start 1/6; Exact date unknown, but at least prior to Nov. 2008; 26 pages.

* cited by examiner

METHOD AND PROGRAMMING TOOL FOR CREATING A USER PROGRAM FOR A SAFETY CONTROLLER

CROSS REFERENCES TO RELATED APPLICATIONS

This application is a continuation of international patent application PCT/EP2009/008279 filed on Nov. 20, 2009 designating the U.S., which international patent application has been published in German language and claims priority from German patent application DE 10 2008 060 003.2 filed on Nov. 25, 2008. The entire contents of these priority applications are incorporated herein by reference.

BACKGROUND OF THE INVENTION

The present invention relates to a method and a programming tool for creating a user program for a safety controller which is designed to control a complex system having a plurality of hardware components which represent programmable subsystems.

A safety controller in terms of the present invention is a device which receives input signals supplied by sensors and generates output signals therefrom by means of logic combinations and possibly further signal processing steps or data processing steps. The output signals can be fed to actuators which bring about actions or reactions in a controlled system as a function of the input signals. In this context, a safety controller must comply with predefined safety standards which are laid down, for example, in European Standard EN 954-1 or a comparable standard such as Standard IEC 61508 or the Standard EN ISO 13849-1. In contrast to a control for what is generally referred to as standard applications, a safety controller guarantees at least single fault safety in the sense of Categories 3 or 4 of the European Standard EN 954-1, or it has at least a Safety Integrity Level (SIL) of 2 according to the specified Standard IEC 61508.

A preferred field of application for such safety controllers is monitoring emergency off buttons, two-hand controllers, protective doors or light curtains in the field of machine safety. Such sensors are used to safeguard a machine or system which, during operation, poses a risk to people or material goods. When the protective door is opened or when the emergency off button is actuated, a respective signal is generated which the safety controller receives as an input signal. In a reaction thereto, the safety controller operates an actuator to switch off the part of the machine or system which poses a risk.

A programmable safety controller provides the user with the possibility of individually defining the logic operations and, if appropriate, further signal processing steps or data processing steps using software, referred to as the user program, in accordance with the requirements of said user. This results in a high degree of flexibility compared to earlier solutions in which the logic operations were generated by defined wiring between several safety switching devices. An example of a method for programming a safety controller is described in DE 101 08 962 A1.

A problem with programming a safety controller is that the user program can become very complex and unwieldy for monitoring a large machine system having a high number of safety devices. Large systems, for example a cement factories, can comprise several thousand sensors. The user program to be created is itself a safety-critical element since a fault in the user program can give rise to an uncontrolled situation and therefore to a hazardous state at the monitored machine or system.

In order to reduce the risk of faults with serious consequences in the user program as a result of human error during the programming, the method according to DE 101 08 962 A1 places a number of restrictions on the user. The user can, in particular, only access predefined, certified program modules and combine them individually. According to the method of DE 101 08 962 A1, however, the user cannot modify the individual program modules and also cannot create any independent program modules. As a result, the method from DE 101 08 962 A1 is restricted to safety controllers for relatively small and medium-sized applications. The method according to DE 101 08 962 A1 does not provide sufficient flexibility for very large systems.

Furthermore, in systems according to the prior art it is disadvantageous that safety controllers are often used in addition to a largely unrestricted, programmable standard controllers. It is desirable to deal with all the standard tasks and safety tasks with a common controller. However, this would increase the complexity of the safety-related programs even further.

International Standard IEC-EN 61131 defines various methods for programming industrial controllers, partially using graphic editors. Here, graphic elements are provided in the form of what is referred to as function blocks, in accordance with the functionality of the machine or system to be controlled. In this context, any hardware component comprised in the machine or system can correspond to a graphic element which represents the functionality of the associated hardware component. The graphic elements can be connected to one another by means of logic operations. In order to reduce the complexity in such methods and devices, it is possible to use a process of forming hierarchies, i.e. the graphic elements can be assigned to the structure of the machine or system to be controlled in accordance with different hierarchy levels. When the user program is created, it is then possible to proceed on a level-by-level basis.

The known methods and devices can contribute to increasing clarity when a user program is created for a safety controller. However, this is not yet optimal, in particular with respect to very complex applications having a large number of safety-related and non-safety-related sensors and actuators.

SUMMARY OF THE INVENTION

It is therefore an object of the present invention to provide a method and a device for programming a safety controller in a more convenient manner.

It is another object of the invention to provide a method and a device for creating a user program for controlling a complex system, wherein said user program includes program code covering various control aspects of the complex system including safety-related functions.

It is yet another object of the invention to provide a method and a programming tool allowing simpler, faster and more cost-effective programming of a safety controller for very complex applications.

According to a first aspect of the invention, there is provided a method for creating a user program for a safety controller designed to control a system having a plurality of hardware components, said plurality of hardware components each having a number of sensors and a number of actuators, and the method comprising the steps of: providing a plurality of software components configured to operate the plurality of hardware components, the plurality of software components each having at least one logic input and at least one logic output and each comprise at least one aspect block, wherein each of said aspect blocks represents one of a plurality of control aspects which are mutually different from one another, wherein each of said control aspects represents a functional aspect of the hardware component, wherein each of said aspect blocks has a number of signal inputs and a number of signal outputs such that a number of input signals can be fed to the respective aspect block, and said respective aspect block is capable of providing a number of output signals, and wherein the output signals are determined as a function of the input signals in said aspect block; creating a component subprogram by logic combination of the plurality of software components, wherein at least some of the logic inputs and at least some of the logic outputs of the software components are connected to one another; creating an aspect subprogram for at least one functional aspect, wherein, for at least one aspect block included in the plurality of software components, at least some of the signal inputs are assigned sensors whose sensor signals are processed in the respective aspect block, wherein at least some of the signal outputs are assigned actuators which are driven with the output signals determined in the respective aspect block; and combining the component subprogram and the aspect subprogram to form the user program.

There is also provided a programming tool for creating a user program for a safety controller designed to control a system having a plurality of hardware components, said plurality of hardware components each having a number of sensors and a number of actuators, the programming tool comprising a personal computer and a programming interface, and said programming interface comprising: a first programming area for providing a plurality of software components configured to operate the plurality of hardware components, the plurality of software components each having at least one logic input and at least one logic output and each comprise at least one aspect block, wherein each of said aspect blocks represents one of a plurality of control aspects which are mutually different from one another, wherein each of said control aspects represents a functional aspect of the hardware component, wherein each of said aspect blocks has a number of signal inputs and a number of signal outputs such that a number of input signals can be fed to the respective aspect block, and said respective aspect block is capable of providing a number of output signals, and wherein the output signals are determined as a function of the input signals in said aspect block; a second programming area for creating a component subprogram by logic combination of the plurality of software components, wherein at least some of the logic inputs and at least some of the logic outputs of the software components are connected to one another; a third programming area for creating an aspect subprogram for at least one functional aspect, wherein, for at least one aspect block included in the plurality of software components, at least some of the signal inputs are assigned sensors whose sensor signals are processed in the respective aspect block, wherein at least some of the signal outputs are assigned actuators which are driven with the output signals determined in the respective aspect block; and a fourth programming area for combining the component subprogram and the aspect subprogram to form the user program There is also provided a computer readable storage medium comprising program code for implementing a programming tool on a personal computer, said programming tool enabling the creation of a user program for a safety controller designed to control a system having a plurality of hardware components, said hardware components each having a number of sensors and a number of actuators, and the programming tool enabling a method comprising the following steps: providing a plurality of software components configured to operate the plurality of hardware components, the plurality of software components each having at least one logic input and at least one logic output and each comprise at least one aspect block, wherein each of said aspect blocks represents one of a plurality of control aspects which are mutually different from one another, wherein each of said control aspects represents a functional aspect of the hardware component, wherein each of said aspect blocks has a number of signal inputs and a number of signal outputs such that a number of input signals can be fed to the respective aspect block, and said respective aspect block is capable of providing a number of output signals, and wherein the output signals are determined as a function of the input signals in said aspect block; creating a component subprogram by logic combination of the plurality of software components, wherein at least some of the logic inputs and at least some of the logic outputs of the software components are connected to one another; creating an aspect subprogram for at least one functional aspect, wherein, for at least one aspect block included in the plurality of software components, at least some of the signal inputs are assigned sensors whose sensor signals are processed in the respective aspect block, wherein at least some of the signal outputs are assigned actuators which are driven with the output signals determined in the respective aspect block; and combining the component subprogram and the aspect subprogram to form the user program.

The new method and the new programming device are based on the idea of introducing and using aspect blocks in the creation of the user program. Each aspect block represents s selected one of a plurality of control aspects which are different from one another, wherein each of said control aspects corresponds to another subfunction of a safety controller. This approach makes available, in addition to the software components, a further structuring tool with which complexity can be reduced when creating a user program for a safety controller. When the term user program is used, or mention is made of the creation of a user program below, what is meant is a control program for a specific control application such as, for example, the specific control program for a production line for certain workpieces.

The creation of a user program therefore corresponds to the implementation of an overall functionality for the system to be controlled. This overall functionality is a combination of various partial aspects such as, for example, the definition of the actual production process, the protection of the system by means of safety equipment, the generation and production of diagnostic information and the like. The new aspect blocks make it now possible to divide the creation of the complex user program into the individual partial aspects. In other words, the new method and the new device comprise a matrix-like organization of the program tasks which occur, namely divided on the one hand into software components which are respectively assigned to specific hardware components, and, on the other hand, divided into aspect blocks which permit programming in a manner which is grouped according to functional partial aspects.

Said programming is preferably independent of the individual hardware components, such as is explained below on the basis of a number of exemplary embodiments.

As a result of the selection of a partial aspect and the concentration on the corresponding aspect block, it is possible to adopt one of a plurality of different views onto the overall functionality and onto the user program to be created. The user can create subprograms which are directed at individual aspects and which are combined later to form the user program. In this context, the aspect subprograms are used in addition to a component subprogram which represents a combination of software components in which aspect blocks are comprised.

As a result of the fact that the different control aspects each represent a separate partial aspect of a safety controller, the aspect subprograms can be created independently. The creation of the user program can take place separately according to independent partial aspects by creating a plurality of independent aspect subprograms.

The new approach corresponds to a vertical division of the overall functionality which is to be implemented for the system to be controlled. The independent partial aspects preferably occur at all the hierarchy levels into which a system to be controlled can be structured. Considering individual partial aspects allows to vertically divide the overall functionality to be implemented.

The new combination of components and aspects makes available two independent measures for subdividing the overall functionality, which make it possible to reduce the complexity to a great degree and therefore to increase clarity.

In a preferred refinement, the plurality of software components correspond to the plurality of hardware components.

This ensures that for each hardware component comprised in the system to be controlled a respective software component is provided which represents the complete functionality of the respective hardware component. This measure contributes to the clarity during the creation of the user program and therefore improves failsafety.

In a further refinement, the step of providing the plurality of software components comprises a step of selecting at least one software component from a set of predefined software components.

This refinement has the advantage that uniform software components are used within a user program. This ensures that, given a corresponding selection, software components which are identical to one another are provided for identical hardware components comprised in the system to be controlled. Use of predefined, i.e. pre-made software components, therefore prevents identical hardware components from being represented by software components which have different technical program behavior from one another. This applies not only to an individual user program but also to a plurality of user programs insofar as they have been created with a computer program using one and the same database which comprises the predefined software components. Overall, this measure increases the clarity and improves failsafety.

Use of predefined software components provides a further advantage. As already mentioned, safety controllers require special approval by relevant supervisory authorities before they are used. This also covers the user program. If predefined software components are used it is sufficient to obtain approval for them once from a supervisory authority. This is generally done together with the approval of the computer program with which user programs can be created. If software components are then provided through selection from a set of predefined software components by means of correspondingly safe measures during the creation of a user program, there is no longer any need for approval for that part of a user program which exclusively comprises such provided software components. This increases the efficiency during the creation of a user program.

In a further refinement of the previously mentioned measure, the predefined software components each represent one of a plurality of hardware component types which are different from one another, wherein each of said hardware component types has a functionality which is characteristic for said hardware component type as such and which comprises each of the hardware components associated with said hardware component type, wherein the predefined software components each comprise those aspect blocks which are assigned to control aspects significant for that hardware component type which represents the predefined software component.

This measure has the advantage that all the relevant aspects which are significant for that hardware component type representing the predefined software component are combined in one predefined software component. In terms of the partial aspects of the safety controller, the hardware component type is described completely by the software component representing it. For the programmer of a user program it is therefore sufficient to provide one software component for a hardware component which is located in the system to be controlled, and specifically to provide said software component by selecting that predefined software component which represents that hardware component type to which the hardware component belongs. Therefore, the programmer only has to select a single software component for the respective hardware component, and there is no need to make available a plurality of software components or additional aspect blocks.

The functionality of the hardware component type may be a mechanical or electrical or electromechanical functionality. These functionalities form the basis for a plurality of differentiating features, with the result that the hardware component types can be, for example, motors or actuation cylinders which, for example, are embodied pneumatically. In addition to elementary components, a hardware component type can stand for a complex assembly, such as process stations, test stations or drilling modules, with this list of elementary components and complex assemblies being not limited to the listed items.

In terms programming technique, a predefined software component corresponds to a placeholder which represents a hardware component type. If the system comprises a hardware component which belongs to a specific hardware component type, then during the creation of the user program a software component is provided, by selecting the corresponding predefined software component, wherein the provided software component corresponds to the real hardware component which is present in the system. This procedure can be compared with the procedure which forms the basis for object-oriented programming. If the laws of object-oriented programming are transferred to the new method, the predefined software component corresponds to a class, i.e. the totality of all the objects of the same type. The provided software component corresponds to an entity, i.e. to an object of a specific class.

In a further refinement, a copy of the selected predefined software component is created and is then provided as a software component.

This measure provides the advantage that a predefined software component can be used at different locations in a user program which is to be created. Said software component can therefore be used multiply, and it can be re-utilized. In this context, all the copies of the predefined software component, i.e. all the software components which are provided and which are based on the same predefined software component have the same properties which are prescribed by the predefined software component. The software components which are provided can only be parameterized. That is to say their functionality is basically fixed by the predefined software components, but it can be easily modified within certain limits. This ensures that identical hardware components which are present in a system to be controlled are represented by software components which basically have an identical functionality. Overall, efficient creation of a user program is made possible. The fact that the provided software components each correspond to a copy of a predefined software component guarantees that identical hardware components which are present in the system to be controlled are represented by identical software components. This improves failsafety.

If the laws of object-oriented programming are transferred to the new method, the creation of a copy corresponds to a predefined software instantiation component.

In a further refinement, the step of providing the plurality of software components comprises creating at least one new software component.

This measure has the advantage that when necessary, i.e. depending on the conditions of the system to be controlled, new required software components can be generated. As a result a high degree of variability is guaranteed, for example for the case in which the predefined software components which are present in the computer program with which the user program is created are not sufficient to model the overall functionality of the system to be controlled.

In a further refinement, the predefined software components and/or the newly created software components each are designed either as group components or as elementary components, wherein a group component includes at least one aspect block and at least one software component, said included software component in turn being designed as an elementary component or as a group component, and wherein an elementary component merely comprises at least one aspect block.

This measure provides a high degree of flexibility. As a result, the provider of a computer program with which the new method can be carried out makes available a plurality of predefined software components for typical elementary components and/or typical group components in a comprehensive database. Approval for these components has generally already been carried out by a supervisory authority, which improves the failsafety.

The newly created software components make it possible to react in a flexible way to conditions which occur at the system to be controlled. As a result, a corresponding software component can be provided for a hardware component for which no corresponding software component has yet been stored in the database, and this can be done specifically independently of the complexity of the hardware component. For a simple hardware component, a software component which is embodied as an elementary component can be provided, and for a complex hardware component a software component which is embodied as a group component can be provided.

It is also possible that, if a programmer determines during the creation of a user program that the creation of the user program is becoming unwieldy because of the large number of software components which are required for the plurality of hardware components present in the system to be controlled, a larger number of hardware components are combined to form a software component which is embodied as a group component. This model forming leads to a reduction in the complexity and therefore to an increase in the clarity. The failsafety is improved overall.

The high degree of flexibility which is provided in terms of the structure of software components which are to be newly created permits the creation of reusable software components. The fact that a software component can be embodied as a group component makes it possible to provide a hierarchically designed or structured user program.

The creation of a new elementary component advantageously comprises the following steps, wherein the new elementary component has a number of logic inputs and a number of logic outputs: providing a number of aspect blocks which are assigned to those control aspects which are significant for that hardware component to which the new elementary component corresponds, wherein the number of aspect blocks each have a number of logic inputs and/or a number of parameterizing inputs in addition to the number of signal inputs, and a number of logic outputs and/or a number of parameterizing outputs in addition to the number of signal outputs, wherein a number of logic variables or a number of intermediate variables which have each been determined in a different aspect block can be fed to the number of aspect blocks in each case via the number of logic inputs, and a number of parameters can be fed via the number of parameterizing inputs, and wherein the number of aspect blocks can output a number of logic variables or a number of intermediate variables required by another aspect block via the number of logic outputs, or can output a number of parameters via the number of parameterizing outputs; defining those logic variables and/or those intermediate variables and/or those parameters and/or those sensor signals which are respectively required for processing in the number of aspect blocks and which are to be fed via the associated inputs; defining those logic variables and/or those intermediate variables and/or those parameters and/or those output signals which are respectively determined in the number of aspect blocks and are output via the associated outputs; connecting at least some of the logic inputs and at least some of the logic outputs of the number of aspect blocks to one another and/or to at least some of the logic inputs and/or to at least some of the logic outputs of the new elementary component; and creating a function program for at least some of the numbers of aspect blocks, wherein the respective function program defines aspect properties of the hardware component for that control aspect to which the respective aspect block is assigned.

The creation of a new elementary component according to the steps described above has the advantage that the new elementary component comprises in terms of programming technology all the information for completely describing or modeling the functionality of the hardware component to which the newly created elementary component corresponds.

The provision of the number of aspect blocks and the logic connection thereof permits all the partial aspects of a safety controller which are significant for the hardware component to be combined into the new elementary component. The creation of the associated function programs permits the functionality which is inherent in the hardware component to be defined. The definition of the variables and/or signals ensures that all the variables and/or signals which are required in the new elementary component according to the functionality of the hardware component are available and that all the variables and/or signals which are to be output by the new elementary component are determined. It is therefore sufficient, in order to capture a hardware component which is comprised in the system to be controlled, merely to provide the newly created elementary component in the user program to be created.

In a further refinement, in a further step the newly created elementary component is changed into an encapsulated state, wherein in this state no modifications can be made to the newly created elementary component.

Encapsulation of the newly created elementary component has the effect that its component properties are concealed. This means that direct access to the internal data structure of the newly created elementary component is prohibited.

Access to the newly created elementary component is possible only via defined interfaces, specifically the inputs and/or outputs thereof.

The component properties are defined by the provided aspect blocks, the function programs stored therein, the logic connection of the aspect blocks and the defined variables and/or signals which are to be fed to the newly created elementary component and/or output thereby. The encapsulation of the newly created elementary component improves failsafety because the newly created elementary component can only be used in an unmodified form, i.e. by maintaining its properties, as often as desired in a user program. It is usually possible that whoever has created the encapsulated new elementary component can carry out modifications at a later time. The user, however, who merely uses an encapsulated new elementary component during the creation of a user program cannot carry out any modifications on said elementary component.

The creation of a new group component advantageously comprises the following steps, wherein the new group component has a number of logic inputs and a number of logic outputs: providing a number of elementary components and/or a number of group components, wherein the number of elementary components and/or the number of group components each have a number of logic inputs and a number of logic outputs; providing a number of aspect blocks which are assigned to those control aspects which are significant for that hardware component to which the new group component corresponds, wherein the number of aspect blocks each have a number of logic inputs and/or a number of parameterizing inputs in addition to the number of signal inputs, and each have a number of logic outputs and/or a number of parameterizing outputs in addition to the number of signal outputs, wherein a number of logic variables or a number of intermediate variables which have each been determined in a different aspect block can be fed to the number of aspect blocks in each case via the number of logic inputs, and a number of parameters can be fed via the number of parameterizing inputs, and wherein the number of aspect blocks can output a number of logic variables or a number of intermediate variables for use by a different aspect block via the number of logic outputs, and a number of parameters can be output via the number of parameterizing outputs; defining those logic variables and/or those intermediate variables and/or those parameters and/or those sensor signals which are respectively required for processing in the number of aspect blocks and which are to be fed via the associated inputs; defining those logic variables and/or those intermediate variables and/or those parameters and/or those output signals which are respectively determined in the number of aspect blocks and are output via the associated outputs; connecting at least some of the logic inputs and at least some of the logic outputs of the number of aspect blocks to one another and/or to at least some of the logic inputs and/or at least some of the logic outputs of the number of elementary components and/or the number of group components and/or to at least some of the logic inputs and/or to at least some of the logic outputs of the new group component; connecting at least some of the logic inputs and at least some of the logic outputs of the number of elementary components and/or of the number of group components to one another and/or to at least some of the logic inputs and/or to at least some of the logic outputs of the new group component; and creating a function program for at least some of the number of aspect blocks, wherein the respective function program defines aspect properties of the hardware component for that control aspect to which the respective aspect is assigned.

The creation of a new group component according to the individual steps described above has the advantage that the new group component comprises in terms of programming technology all the information for completely describing or modeling the functionality of the hardware component to which the newly created group component corresponds.

The provision of the number of aspect blocks and the logic connection thereof permits all the partial aspects of a safety controller which are significant for the hardware component to be combined in the new group component. The provision of the number of elementary components and/or the number of group components and the logic connection thereof enables all the components combined in the hardware component to be taken into account. The creation of the associated function programs permits the functionality which is inherent in the hardware component to be defined. The definition of the variables and/or signals ensures that all the variables and/or signals which are required in the new group component according to the functionality of the hardware component are available and that all the variables and/or signals which are to be output by the new group component are determined. It is therefore sufficient, in order to capture a hardware component which is comprised in the system to be controlled, merely to provide the newly created group component in the user program to be created.

In the case of a group component, one of a plurality of stored functionalities can advantageously be activated or selected by means of a functionality parameter. These functionalities are preferably stored in a software component which is comprised in the group component, and define the functionality of said software component. Each of said functionalities is assigned a defined functionality parameter value. It is therefore preferably possible when creating a group component to activate or select one of the stored functionalities by defining the functionality parameter value. A software component which represents an emergency off button is an example of this. Emergency off buttons are available in a wide variety of embodiments and therefore functionalities, for example with or without an acknowledge input. By defining the corresponding functionality parameter value it is then possible, when creating the group component, to define whether a first functionality which models an acknowledge input is to be activated in accordance with the real conditions for that software component which represents an emergency off button installed in the hardware component, or else whether a second functionality is to be activated in which no acknowledge input is mapped. As is shown by the specific example of the emergency off button, this measure has the advantage that in each case an independent assigned software component does not have to be predefined for each emergency off button which is implemented by means of hardware equipment. Instead, it is sufficient to predefine one software component which represents a plurality of emergency off buttons which are configured differently in terms of hardware equipment, and can be adapted to the hardware equipment conditions by defining a functionality parameter value. A software component which is provided with a functionality parameter therefore represents a hardware component type. This contributes to greater clarity when creating the user program and therefore improves the failsafety. The functionality parameter value is preferably stored in an aspect block which is assigned to the standard operational control aspect or to the safety control aspect.

In addition to the preferred embodiment described above, according to which the stored functionalities relate solely to the software component, it is also conceivable for the stored functionalities to relate to the entire group component and therefore to influence the respective functionalities of a plurality of software components comprised in the group component. In addition it is conceivable that, in addition to the preferred procedure described above, the functionality parameter values are defined during the creation of a group component and that the latter are defined only when an aspect subprogram is created. Furthermore, it is also conceivable for an elementary component to be provided with a functionality parameter, for example a software component, which represents an independent emergency off button.

In a further refinement, the newly created group component is changed into an encapsulated state in a further step, wherein in this state no modifications can be carried out on the newly created group component.

The advantages which have been presented above for a newly created elementary component which has been changed into an encapsulated state also apply in a corresponding manner to a newly created group component which is changed into an encapsulated state. The component properties of the newly created group component are defined by the provided aspect blocks, the function programs stored therein, the logic connection of the aspect blocks, the provided elementary components and/or group components and the logic connection thereof, and the defined variables and/or signals which are to be fed to the newly created group component and/or output thereby. The component properties of the newly created group component therefore also comprise the component properties of the elementary components and/or group components comprised therein.

In a further refinement, a copy of the newly created software component is created and is then provided as a software component.

The advantages which are represented above for the creation of a copy of the selected predefined software component also apply in a corresponding way to a newly created software component of which a copy is created.

In a further refinement, the predefined software components and/or the newly created software components are each encapsulated software components on which no modifications can be carried out.

With respect to the advantages which are obtained by encapsulating the newly created software components, reference is made to the statements which were presented above in this context with regard to newly created elementary components and newly created group components. These advantages also apply in a corresponding way to predefined software components. The component properties thereof also remain concealed. In a predefined software component, there is usually provision that no modifications can be carried out on the encapsulated software components by the user of the computer program with which the new method can be carried out or by the programmer who creates the user program. Whereas, on the part of the manufacturer of the computer program, changes can certainly be made to the predefined software components. Any number of encapsulated software components can be used in a user program. As many copies of said component as desired can be created and provided.

In a further refinement, the encapsulated software components can be changed into a processing mode, wherein in this processing mode modifications can be carried out to the encapsulated software components.

In the processing mode, an encapsulated software component can be processed, and fundamental modifications can therefore be carried out thereto. These modifications are taken into account in all the copies which were created of this predefined software component and which are provided as a software component in a user program. These modifications go beyond the modifications which can be made to a software component by predefining parameter values. The intention is that with these modifications, for example, the functionality of a software component will be able to be adapted to the control task.

The described measure has the following advantage, if, for example, during the creation of a user program it is determined that a predefined software component does not completely comprise the functionality of that hardware component to which the predefined software component corresponds, because for example modifications have been made to the hardware component during the manufacturing process at the manufacturer's, the predefined software component can be processed to the effect that the functionality is completely included. This measure can also be used to create a new software component by using a predefined software component. For this purpose, the predefined software component is changed into the processing state and is modified at least to a certain extent. This makes it possible to modify a predefined software component which does not comprehensively describe the properties of a hardware component, to the effect that the new software component which is generated therefrom comprehensively describes these properties. Since this involves making recourse to an already existing predefined software component, this leads to a saving in time during the creation of the new software component. Overall, the refinement described above provides a maximum degree of flexibility during the creation of a user program.

In a further refinement of the measure specified above, the function programs which are respectively stored in the assigned aspect blocks can be modified in the processing mode, at least for some of the control aspects.

This measure provides the possibility of easily adapting the functionality of an existing software component to changed conditions. A large degree of flexibility is therefore guaranteed during the creation of a user program.

In a further refinement of the measure specified above, for that control aspect which represents the partial aspect of a safety controller, the function programs which are respectively stored in the assigned aspect blocks cannot be modified.

This measure ensures that once the functionality for the safety controller has been defined and approved by a supervisory authority, it is retained. This contributes to improving failsafety. The functionality which is relevant for the safety controller therefore cannot be changed fundamentally. It can only be modified by means of parameters within certain limits, for example through the prescription of corresponding intervals.

In a further refinement, a function program is stored in at least some of the aspect blocks comprised in the provided number of software components, which function program defines aspect properties of the hardware component for that control aspect to which the respective aspect block is assigned, wherein parameters are processed in the function program, wherein parameter values can be predefined for the parameters, wherein a change in the parameter values brings about a modification of the aspect properties.

A change in the parameter values leads to a modification of the aspect properties. The aspect properties can therefore easily be adapted to the properties of the system to be controlled, within the limits which are predefined by the parameter values. In contrast to the measure according to which an encapsulated software component is changed into a processing mode in which fundamental modifications can be carried out to the software component, primarily modifications to the functionality thereof, in the case of a modification of the aspect properties the functionality of the software component is fundamentally retained.

In a further refinement, the parameter values are predefined during the creation of an aspect subprogram for the aspect blocks which are taken into account in the process.

The combination of the two working steps of the predefinition of the parameter values and the creation of the aspect subprogram permits, on the one hand, efficient creation of user programs, and on the other hand, improves the failsafety. The simultaneous assignment of the sensors to the signal inputs of the aspect blocks and the predefinition of the parameter values provides a comprehensive overview of the individual aspect blocks.

In a further refinement, a function program is stored in each of the aspect blocks, which function program defines aspect properties of a hardware component for that control aspect to which the respective aspect block is assigned, wherein this is that hardware component to which that software component which comprises the respective aspect block corresponds, wherein at least one of the plurality of control aspects which are different from one another, and therefore the aspect properties which are defined for the latter, relate to the hardware component as such.

This measure provides the advantage that the functionalities and therefore the properties can be predefined in a targeted fashion for the respective software component on an aspect basis, i.e. in relation to the individual partial aspect of a safety controller. As a result, the user program can be created precisely, and the overall functionality of the system to be controlled can be determined precisely. In addition, it is ensured that all the data and information necessary for the description of the functionality of a hardware component is comprised in a single software component. Overall, this measure improves the failsafety.

In a further refinement, at least some of the plurality of software components also comprise, in addition to a number of aspect blocks, a number of elementary components and/or a number of group components, wherein a group component includes at least one aspect block and at least one software component, said included software component in turn being designed as an elementary component or as a group component, and wherein an elementary component merely comprises at least one aspect block, wherein a function program is stored in each of the number of aspect blocks, which function program defines aspect properties for that control aspect to which the respective aspect block is assigned, wherein at least one of the plurality of control aspects which are different from one another relates to an interaction of at least some of the number of elementary components and/or at least some of the number of group components, and, accordingly, the aspect properties defined for the at least one control aspect relate to said interaction The measure according to which a control aspect relates to the interaction of a plurality of hardware components, which are in turn arranged in a hardware component, has the following advantage: if a system to be controlled comprises a hardware component which comprises a plurality of hardware components, as a result of the provision of the software component which corresponds to this hardware component, the functionality of which predefines the interaction between the included hardware components is simultaneously also provided. This reduces the complexity during the creation of a user program and therefore improves the failsafety. A partial aspect of a safety controller, which relates to the interaction of a plurality of hardware components, is, for example, the partial aspect of locking.

The control aspects which are different from one another can advantageously be any number of the following control aspects: a standard operational control aspect which represents the partial aspect of standard control, i.e. the operational sequence of the system which is required for a specific application; a safety control aspect which represents all the safety measures for avoiding accidents; a diagnostic aspect which represents the collection and processing of diagnostic information; a visualization aspect which comprises all the program steps which are necessary for visualizing system states; a drive control aspect which represents the details of one or more drive controllers within the system; a cooling aspect which represents all the measures which are necessary for cooling; an access authorization aspect which includes all the measures which relate to access authorization; a maintenance aspect which represents all the program steps which are necessary for regular maintenance; a locking aspect which represents the partial aspect of locking; a manual operation aspect which represents the partial aspect of manual operation; and a data management aspect which represents the partial aspect of data management.

Different functional control aspects can therefore be programmed for the entire system, wherein each of said control aspects represents an independent partial aspect of the controller. The independent partial aspects have few features in common, for which reason they are suitable for dividing the overall functionality which is to be created for the system to be controlled into a plurality of secondary functionalities. As a result, the complexity during the creation of a user program can be reduced. In addition, this provides the possibility that the individual aspect subprograms can be created by a respective expert. Overall this leads to an improvement in the failsafety.

The control aspects specified above can be divided into technology-related and application-related control aspects. The technology-related aspects include, for example, the safety control aspect, the standard operational control aspect, the diagnostic aspect and the visualization aspect. The application-related control aspects include, for example, the locking aspect and the manual operation aspect.

The partial aspect of standard control relates to those parts of a safety controller in which standard variables are processed and therefore do not have to be configured in a failsafe manner. The partial aspect of safety controller relates to those parts of a safety controller in which safety-relevant variables are processed and which therefore have to be configured in a failsafe manner. The partial aspect of diagnostics relates to those parts of a safety controller which are designed for identifying faults or causes of faults. The partial aspect of visualization relates to those parts of a safety controller which are designed for displaying data or states of hardware components. Those parts which permit interaction of the operator of the system with the safety controller are also to be included. The partial aspect of drive control relates to those parts of a safety controller which are designed to control a drive, specifically in the sense of setting and maintaining, for example, a rotational speed or a speed or a force. The partial aspect of cooling relates to those parts of a safety controller which are designed for cooling hardware components which are comprised in the system to be controlled. The partial aspect of access authorization relates to those parts of a safety controller which are designed to switch over the system to be controlled from, for example, an operating mode of automatic operation, in which a user program is executed, into an operating mode of configuration in which a set-up of the system to be controlled can be made. The partial aspect of maintenance relates to those parts of a safety controller which are directed at measures for maintaining the functional capability of the system to be controlled. The partial aspect of locking relates to those parts of a safety controller which are designed to ensure that a system to be controlled cannot be started until certain start-up conditions are met, for example a protective door is locked. Additionally or alternatively, the partial aspect of locking also relates to those parts which are designed to ensure that a hardware component comprised in the system cannot assume a specific state until another hardware component with which said hardware component interacts assumes a predefined state. The partial aspect of manual operation relates to those parts of a safety controller which are designed to ensure that the system to be controlled switches over from automatic operation to manual operation in which individual steps of the user program can be incrementally executed. The partial aspect of data management relates to those parts of a safety controller which are designed to collect and store data.

The above list is not exhaustive. For example, a control aspect simulation can be provided. With an aspect block which is assigned to this control aspect, that software component in which this aspect block is comprised can be checked. For example, the behavior or the function of the software component can be checked. It is also possible to provide a control aspect documentation. An aspect block which is assigned to this control aspect serves to support that control aspect which creates a user program. There is therefore provision that such an aspect block has stored in it information about that software component in which the respective aspect block is comprised. This may be the following information: description of the software component, description of the interfaces of the software component, description of the parameters used in the software component, description of the functionality and of the possible use of the software component. However, it is also conceivable to store, in such an aspect block, information for the operator of the system controlled with the safety controller. This may be, for example, the following information: operator instructions for that hardware component to which the software component in which the aspect block is comprised corresponds, the field of use of the hardware component.

An aspect block is preferably provided by selecting a specific aspect block which is comprised in a set of selectable and therefore predefined aspect blocks. However, it is also conceivable that a person who creates a user program can also create an aspect block on an application-specific basis, or he creates further aspect blocks which can then be advantageously added to the already existing list of selectable aspect blocks. The creation of further aspect blocks allows a machine tool manufacturer, for example, to define individual aspect blocks which are company-specific in terms of their profile and/or their structure, and to use said aspect blocks. The possibility of being able to define a new aspect block enables the creator of a user program to add a further viewpoint to those viewpoints from which the system to be controlled can already be seen on the basis of the predefined aspect blocks. Therefore, aspect blocks can be provided either by creation or by selection, just as with the procedure for providing software components.

The creation of a new aspect block requires essentially the following steps: definition of a block; specification of a name for the new aspect block; definition of the content of the aspect block and therefore definition of a new partial aspect. The partial aspect of drive control advantageously comprises not only control tasks which can usually be carried out with a non-failsafe standard controller, i.e. using non-failsafe standard variables, and to this extent should be assigned to the standard operational control aspect. Instead, the partial aspect of the drive control can also comprise control tasks which are safety-related and can therefore be assigned to the safety control aspect and should therefore be carried out using failsafe variables.

Examples of such control tasks which should be assigned to the safety control aspect are the control tasks which are to be processed within the scope of a "failsafe braking profile monitoring" or the control tasks which are to be processed within the scope of a "failsafe reduced speed". The "failsafe braking profile monitoring" relates to the controlled braking of a motor. The motor is to come to a standstill by complying with a parameterized braking profile, wherein by means of the parameterization it is possible to predefine how steep the drive speed will decrease. The parameterized braking profile provides, for various times within a predefined time interval that maximum rotational speed of the motor which it can assume. If it is detected that these predefined values cannot be complied with, i.e. if the rotational speed of the motor which is actually present for individual times is above the predefined values, actuators which are, for example, embodied as contact breakers and which are used to connect the motor to the power supply are actuated in order to disconnect the motor from the power supply. The "failsafe reduced speed" preferably relates to the operation of a robot in the maintenance mode. During the maintenance operations it is to be easily possible for the robot to carry out movements. However, in order to keep the risk of injury to the maintenance personnel as low as possible, the movement speed which is reached in the process must not exceed a predefined value. This predefined value is defined by means of a parameter. During the maintenance operations, the currently reached movement speed of the robot is sensed and compared with the predefined value. If the predefined value is exceeded, those contact breakers with which the robot is connected to the power supply are actuated in order to disconnect the robot from the power supply.

In a further refinement, a number of aspect blocks are provided in addition to the plurality of software components, wherein said number of aspect blocks are used during the creation of an aspect subprogram.

This measure has the advantage that aspect properties can be assigned for the hardware components to which the plurality of provided software components correspond. For example, interaction of these hardware components can therefore be defined, preferably in the sense of locking.

In a further refinement, the user program is structured hierarchically, wherein a hierarchy level which is the top hierarchy level is defined by the provided plurality of software components, and wherein a further hierarchy level below the top hierarchy level is defined by at least one software component which is comprised in one of those software components which belongs to the provided plurality of software components.

This refinement constitutes a measure with which the complexity during the creation of a user program can be reduced. Therefore, in addition to the measure which is based on the new approach, a second measure for reducing the complexity is made available. As already stated, the measure which is based on the new approach allows vertical division of the total functionality of the system to be controlled. In contrast, the measure of the formation of hierarchies on the basis of the different hierarchy levels brings about a division of the total functionality in the horizontal direction. The two measures therefore have different ordering directions or classification directions, for which reason they do not have a disadvantageous effect on one another when used simultaneously. As a result, these two measures or structuring approaches can be combined with one another without problems, for which reason their combination is particularly logical. The complexity can be reduced to a very great degree and therefore the clarity can be increased to a very great degree, which ultimately leads to a very significant improvement in the failsafety.

In a further refinement of the measure specified above, a number of aspect blocks are provided in addition to the plurality of software components, wherein at least some of the plurality of software components and at least some of the number of aspect blocks are combined to form a new software component, as a result of which a new top hierarchy level is defined, below which the previous top hierarchy level lies as a hierarchy level which is second from the top.

This measure has the advantage that at any stage during the creation of a user program some of the plurality of software components can be combined within the top hierarchy level by taking into account correspondingly necessary aspect blocks to form a new software component in order, as a result, to reduce the complexity which is attained in the top hierarchy level. This measure can advantageously also be applied in a corresponding way for an already existing further hierarchy level which is below the top hierarchy level. A measure is therefore available with which the complexity in any hierarchy level can be reduced in said hierarchy level.

In a further refinement, the user program is structured into a plurality of hierarchy levels of which one can be selected, wherein only those aspect blocks which are comprised in the selected hierarchy level are used during the creation of an aspect subprogram.

This measure has the advantage that the number of aspect blocks to be taken into account during the creation of an aspect subprogram can be reduced. This further reduces the complexity during the creation of a user program and further improves the failsafety.

Overall, during the creation of an aspect subprogram all the aspect blocks which are assigned to the control aspect which is being respectively considered have to be taken into account. Since only those aspect blocks which are comprised in the selected hierarchy level are now taken into account, a program fragment is respectively created for the selected hierarchy level. For the hierarchy levels which are not selected, a common program fragment is likewise created. The individual program fragments are then combined to form the aspect subprogram which is to be created. An alternative procedure is that for each of the selected hierarchy levels an independent aspect subprogram is created and a common aspect subprogram is created for the hierarchy levels which are not selected. This means that the number of aspect subprograms which are created is increased.

In a further refinement, one of the hierarchy levels can be defined as a reference hierarchy level, wherein an independent aspect subprogram is respectively created both for the reference hierarchy level and for those hierarchy levels which lie in the hierarchy above the reference hierarchy level, wherein during the creation of the respective independent aspect subprogram only those aspect blocks which are comprised in the respective hierarchy level are taken into account, and wherein an aspect subprogram is created for the hierarchy levels which lie below the reference hierarchy level, wherein during the creation of the aspect subprogram all the aspect blocks which are comprised in these hierarchy levels are taken into account.

This measure permits particularly efficient creation of a user program. The reference hierarchy level can be defined in such a way that only those hierarchy levels for which individual consideration leads to a significant reduction in the complexity are subjected to individual consideration. In contrast, those hierarchy levels for which the number of aspect blocks to be taken into account is manageable are considered together. The reference hierarchy level can advantageously be defined by the programmer of the user program and therefore adapted to his requirements.

Advantageously, at least some of the aspect blocks comprise the following units, wherein each of the aspect blocks has a number of inputs via which input signals can be fed to the respective aspect block, and a number of outputs via which the respective aspect block can output output signals: an identifier unit in which an identifier which defines that control aspect to which the aspect block is assigned is stored, a functional unit in which a function program is stored with which an aspect property is defined of that hardware component to which that software component in which the aspect block is comprised corresponds, a parameterizing unit in which parameter values for parameters which are processed in the function program are stored, and an interface unit in which the number of inputs and the number of outputs of the aspect block are combined.

This structured design of the aspect blocks permits, on the one hand, efficient creation of a user program, and, on the other hand, it guarantees, through the division into a functional unit, into a parameter unit and into an interface unit, a user program which is optimized in terms of speed and storage space requirements. As far as the structure of the aspect blocks is concerned, it is conceivable for them to each have an identifier unit, a function unit and an interface unit in all cases. The parameter unit may merely be present when required, i.e. if parameters are provided in the function program. This procedure is advantageous in terms of the storage space requirement for the created user program.

In a further refinement, at least some of the software components comprise at least the following units, wherein each of the software components has a number of inputs via which input signals can be fed to the respective software component, and has a number of outputs via which the respective software component can output output signals: a number of aspect blocks, a number of elementary components and/or group components, wherein a group component comprises at least one aspect block and at least one software component, wherein the included software component itself can in turn be embodied as an elementary component or as a group component, and wherein an elementary component merely comprises at least one aspect block, and an interface unit in which the number of inputs and the number of outputs of the software component are combined.

The standard structure of the software component guarantees compatibility of the software components with one another. This permits particularly efficient creation of a user program. At the same time, fault sources with respect to the logic combination of the software components are eliminated, which contributes to improving the fault safety. All the software components preferably have this structure.

In a further refinement, the inputs are a number of signal inputs and/or a number of logic inputs and/or a number of parameterizing inputs, and the outputs are a number of signal outputs and/or a number of logic outputs and/or a number of parameterizing outputs, wherein a number of input signals can be fed via the number of signal inputs, and a number of logic variables can be fed via the number of logic inputs, and a number of parameters can be fed via the number of parameterizing inputs, and wherein a number of output signals can be output via the number of signal outputs, and a number of logic variables can be output via the number of logic outputs, and a number of parameters can be output via the number of parameterizing outputs.

The bundling of both the inputs and of the outputs into three types of interfaces, specifically logic interfaces, parameter interfaces and hardware interfaces for the signals allows for a high degree of compatibility. This permits efficient creation of a user program. At the same time, possible faults during the connection of software components and/or of aspect blocks are reduced, as a result of which the failsafety is improved. The number of inputs and outputs which are assigned to the respective interface type is variable according to the respective conditions.

Advantageously, the interface units which are respectively comprised in the aspect blocks and those in the software components have a functionally identical structure to the respectively included interface units.

This measure allows for optimal compatibility. As a result, the software components are compatible with one another. The aspect blocks are also compatible with one another. In addition, compatibility between the aspect blocks and the software components is guaranteed. This permits both efficient creation of a user program and improvement of the failsafety.

In a further refinement, each of the aspect blocks has a function program stored in it, which function program defines aspect properties of a hardware component for that control aspect to which the respective aspect block is assigned, wherein the hardware component is that hardware component to which that software component which comprises the respective aspect block corresponds, wherein the individual function programs are created using a programming language which is respectively selected from a plurality of different programming languages.

This measure ensures that the most suitable programming language can be used for the creation of the individual function programs. In this context it is possible to provide that the computer program with which the new method can be carried out respectively selects or predefines the most suitable language which is defined according to objective criteria. This may be advantageous for individual partial aspects, for example the partial aspect of the visualization or the partial aspect of the diagnostics. Alternatively or additionally there is provision that the programmer who creates a user program can select the most suitable programming language according to subjective criteria. The different programming language from which it is possible to select may be, for example, the languages listed in part 3 of the European Standard IEC/EN 61131: Instruction List, Ladder Diagram, Function Block Diagram, Sequential Function Chart and Structured Text. A further possible programming language is the language Continuous Function Chart. In addition to the programming languages specified in Standard IEC/EN 61131, in principle any programming language which is compatible with the Standard IEC/EN 61499, for example even the programming language Java, is possible. For the partial aspect of standard controller and the partial aspect of safety controller, all the programming languages which are mentioned in the Standard IEC/EN 61131 are possible. For the partial aspect of visualization, for example the programming language OBST can be used. In the case of the partial aspect of diagnostics, a division is conceivable. The diagnostic conditions can therefore be programmed using one of the programming languages specified in the Standard IEC/EN 61131. The parts required for displaying the diagnostic messages can be programmed in a different programming language. The selection of the most suitable programming language also ensures that the most suitable editor is used.

The software components and/or the aspect blocks are advantageously represented by means of graphic symbols on a user interface.

On the basis of this measure it is possible to configure the actual process for programming in a particularly clear and easily understood fashion, as a result of which fault sources due to human error or inattentiveness can be considerably reduced. The failsafety is considerably increased.

Preferably, the software components and/or the aspect blocks are provided using a drag & drop function.

A drag & drop function is already known per se from graphic user interfaces in commercially available PCs. In this context, an element is marked using an input device, for example by means of what is referred to as a mouse, and is then moved by means of the input device to a desired location or copied. Such a method of selection is very simple and convenient for the programmer. As a result, incorrect operator control operations and resulting fault sources during programming are reduced further considerably.

In a further refinement, inputs and outputs of the software components and/or inputs and outputs of the aspect blocks are connected by drawing graphic lines.

This measure constitutes a simple and therefore less fault-prone handling method. As a result, failsafety is improved.

In a further refinement, an aspect subprogram is created for each of a plurality of the control aspects which are different from one another, wherein the individual aspect subprograms are created separately.

On the basis of this measure, the complexity during the creation of a user program is reduced to a high degree. The creation of the individual aspect subprograms can advantageously take place in a chronologically separated fashion, with the result that the individual aspect subprograms are created in chronological succession. Alternatively or additionally, a spatial separation can also be provided. Spatial separation involves the individual aspect subprograms being respectively created using a separate graphic user interface. As a result it is possible, inter alia, to create a plurality of aspect subprograms chronologically in parallel if the individual graphic user interfaces are represented on a monitor. This permits a user program to be created in a particularly efficient way.

In one preferred refinement, all the aspect blocks which are comprised in the plurality of software components and are assigned to this control aspect are taken into account during the creation of an aspect subprogram for a control aspect.

This measure guarantees a uniform handling method within a control aspect and therefore contributes to improving the failsafety.

The new method and the new device have the following further advantages: while hitherto it was necessary to use different computer programs or tools to create a user program—usually each partial aspect required a different programming tool—now only a single programming tool is needed. As a result, compatibility problems, which can occur when the user program is created using a plurality of programming tools, are avoided. It is not necessary to deal with a plurality of computer programs or tools: it is sufficient to familiarize oneself with one thereof. During the creation of a user program, all the partial aspects can be taken into account in a comprehensive way.

Of course, the features which are mentioned above and those which are still to be explained below can be used not only in the respectively specified combination but also in other combinations or alone without departing from the scope of the present invention.

BRIEF DESCRIPTION OF THE DRAWINGS

Exemplary embodiments are illustrated in the drawing and will be explained in more detail in the following description. In the drawing.

DESCRIPTION OF PREFERRED EMBODIMENTS

Figure 1:
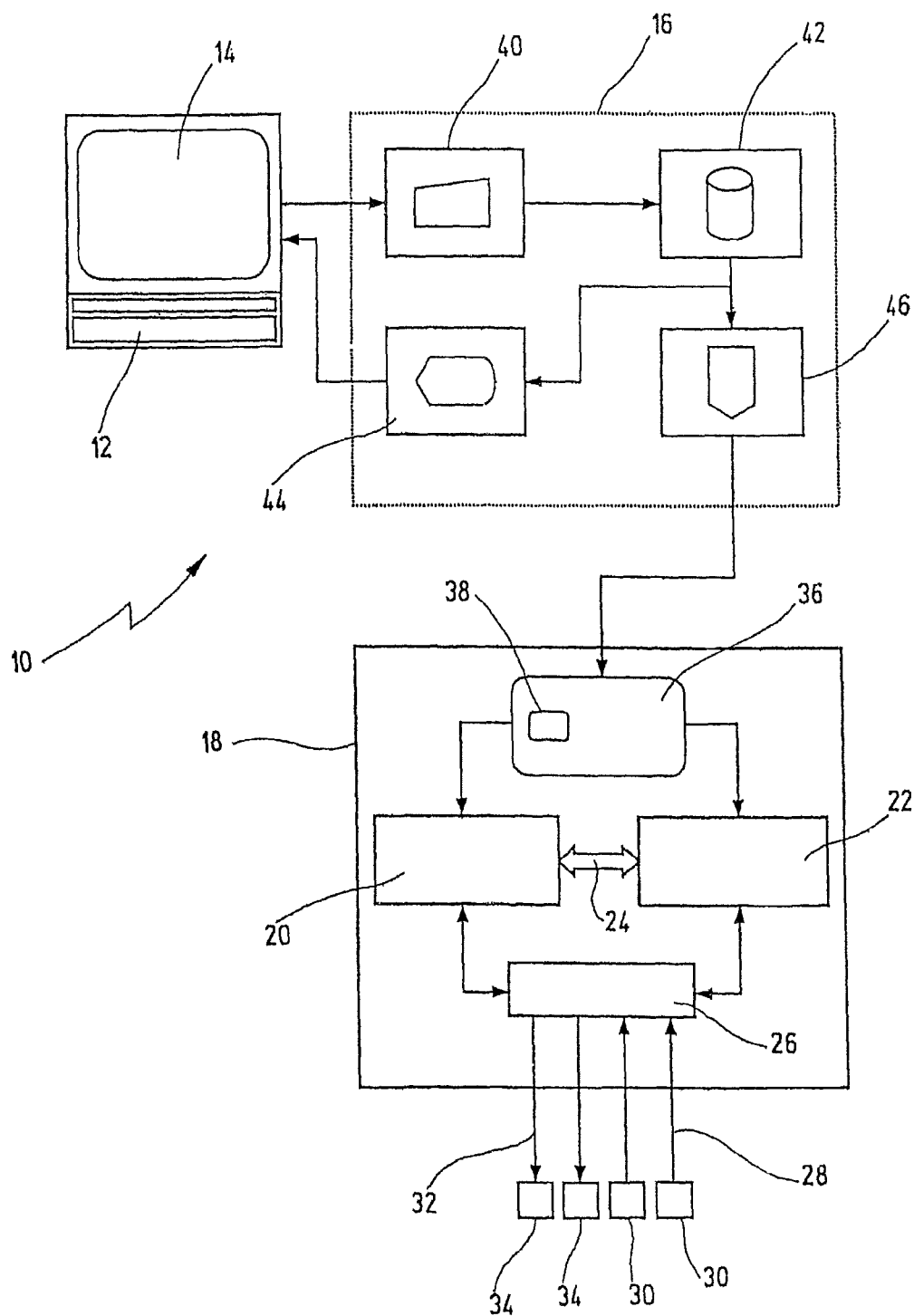
FIG. 1 shows a schematic illustration of an exemplary embodiment of the new device in conjunction with a safety controller for which a user program is to be created.

In FIG. 1, an exemplary embodiment of the new device is denoted in its entirety by reference number 10.

The device 10 comprises a conventional PC 12 with a monitor 14 on which a computer program 16 is executed. The computer program 16 permits a user program 38 for a safety controller to be created. Therefore, PC 12 and computer program 16 together may be referred to as a programming tool.

The safety controller which is to be programmed and for which a user program is to be created is denoted by the reference number 18 in FIG. 1. It is designed here with two-channel redundancy in order to achieve a failsafety desired for controlling safety-critical processes. By way of example for the two-channel design, FIG. 1 shows two processors 20, 22 which are separate from one another and which are connected to one another via a bidirectional communication interface 24, in order to be able to monitor one another and exchange data. The two channels of the safety controller 18 and the two processors 20, 22 are preferably different, i.e. have different structures from one another, in order to largely rule out systematic faults.

An input unit/output unit connected to each of the two processors 20, 22 is denoted by reference number 26. The input/output unit 26 receives input signals 28 from external sensors 30 and passes them on to each of the two processors 20, 22 in an appropriate data format. In addition, output signals 32 for driving actuators 34 are generated by the input/output unit in dependence on the processors 20, 22.

The sensors 30 are, for example, emergency off buttons, two-hand buttons, protective door switches, rotational speed monitoring devices, light barriers, safety switches, end position switches or other sensors for registering safety-related variables. For a preferred case in which the safety controller includes a partial aspect of drive control, the sensors 30 may also comprise sensors which are usually used in standard controllers for detecting variables representative of a rotational angle, a drive speed and/or a position.

The actuators 34 are, for example, contact breakers with which the power supply of a drive or of an entire machine can be switched off. The actuators 34 may, however, also be actuators for implementing a movement, such motors or cylinders, in particular cylinders of pneumatic design, as they are used, for example, for a linear movement.

A chip card on which a user program 38 is stored is denoted by the reference number 36. The user program 38 is created using the device 10, and said user program 38 defines the control operations which are to be carried out by the safety controller 18. These control operations in turn define the overall functionality of the system which is to be controlled by the safety controller. The use of a chip card 36 as a storage medium permits the user program 38 to be easily exchanged. Alternatively, the user program 38 can be loaded into a memory of the safety controller 18 via a data communication interface.

The computer program 16 provides, on the monitor 14, user interfaces which will be explained in more detail below. The user interfaces provide a programmer with software components and aspect blocks and permit the programmer to create a component subprogram and aspect subprograms, wherein the component subprogram and the aspect subprograms are combined to form the user program 38.

The provision of the software components and of the aspect blocks as well as the creation of the component subprogram and of the aspect subprograms are symbolized in FIG. 1 by a function block 40. After a programmer has provided the desired software components and aspect blocks, parameterized the software components, if appropriate, and created the component subprogram and the aspect subprograms, this is all stored in a memory 42 of the PC. It is preferably protected there with at least one check sum CRC (Cyclic Redundancy Check). The user program can then be transmitted from memory 42 to the chip card 36 or directly to the safety controller 18. The protection with the CRC ensures here that the transmitted user program corresponds to the previously generated user program which is stored in memory 42.

The user program 38 here comprises both control tasks which according to the prior art are usually carried out with a non-failsafe standard controller (and to this extent should be assigned to a standard operational control aspect) as well as control tasks which are safety-related and should therefore be related to a safety control aspect. The safety controller 18 has a bus system via which all the data exchanged between individual components of the safety controller 18, which occurs during the processing of the user program 38, passes. In other words, the exchange of data occurs via this bus system both for the case in which control tasks assigned to the standard operational control aspect are processed and for the case in which control tasks assigned to the safety control aspect are processed.

Figure 2:
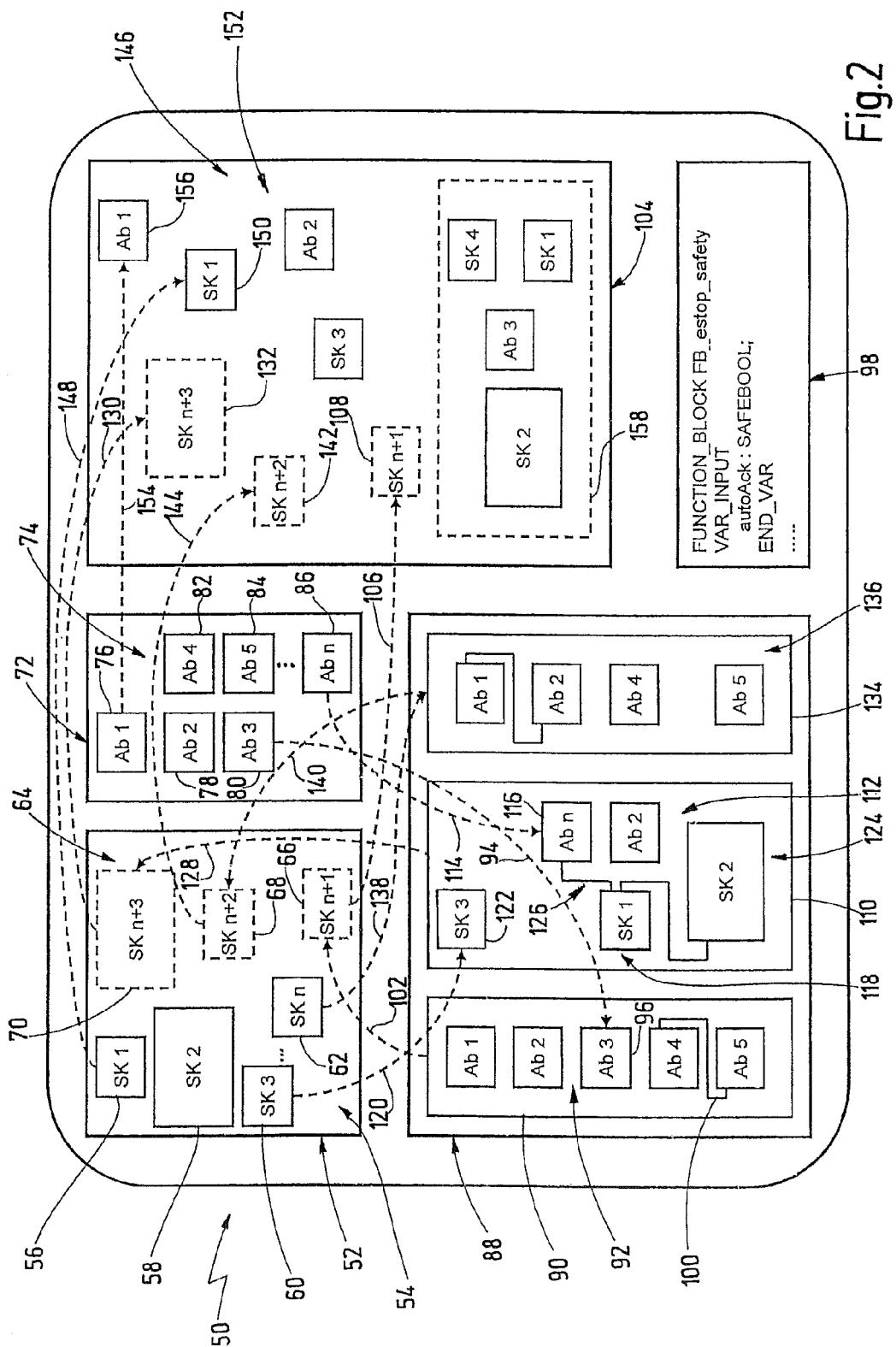
FIG. 2 shows a simplified illustration of a first graphic interface for providing software components.

FIG. 2 shows a first graphic interface which the computer program 16 provides to the programmer on the monitor 14, denoted in its entirety by reference number 50.

The first graphic user interface 50 comprises a software component field 52 which comprises a set 54 of predefined software components in the form of graphic symbols, wherein the individual predefined software components are denoted by the reference numbers 56, 58, 60, 62. The predefined software components 56 to 62 have been created by the provider of the computer program 16 with which the new method for creating a user program 38 can be carried out, and they are stored in a database or library comprised in this computer program 16. The designations SK 1, SK 2, SK 3 and SK n which are allocated to the predefined software components 56 to 62 in FIG. 2 indicate that the set 54 of predefined software components can comprise more than four predefined software components 52 to 62 illustrated in FIG. 2.

The software component field 52 comprises a set 64 of newly created software components in the form of graphic symbols, wherein the individual newly created software components are denoted by the reference numbers 66, 68, 70. The newly created software components 66 to 70 are software components which have been created and subsequently encapsulated by the programmer during the creation of the user program 38 for hardware components which are comprised in the system to be controlled and for which the database or library of the computer program 16 does not comprise any appropriate predefined software component. In a corresponding way, the predefined software components 56 to 62 are also encapsulated.

The encapsulation ensures that the properties and/or the functionality of the predefined software components 56 to 62 and of the newly created software components 66 to 70 can no longer be changed after they have been created. The designations SK n+1, SK n+2 and SK n+3 which are used for the newly created software components 66 to 70 indicate that the database or library comprised in the computer program 16 is extended by these new software components. These new software components can therefore be used at a later time in addition to the software components 56 to 62 which are already predefined at the manufacturer's, when, for example, a further user program is to be created.

For the sake of better differentiation, in the software component field 52 the predefined software components 56 to 62 are represented by unbroken lines and the newly created software components 66 to 70 are represented by dashed lines. In addition, in the software component field 52 software components which are embodied as what are referred to as elementary components are represented by a small block, while software components which are embodied as group components are represented by a large block. These forms of representation are valid for all of FIG. 2. In addition it is to be noted that both the predefined software components 56 to 62 and the newly created software components 66 to 70 can be respectively selected.

The first graphic user interface 50 comprises an aspect block field 72 which comprises a set 74 of selectable aspect blocks in the form of graphic symbols, wherein the individual aspect blocks are denoted here by reference numbers 76, 78, 80, 82, 84, 86.

Each of the aspect blocks 76 to 86 is assigned to one of a plurality of control aspects which are different from one another, wherein each of said control aspects represents an individual partial aspect of the safety controller as a whole. The designations Ab 1, Ab 2, Ab 3, Ab 4, Ab 5 and Ab n which are used for the aspect blocks 76 to 86 are intended to indicate that more than six aspect blocks represented in FIG. 2 can be made available in the computer program 16. The aspect blocks 76 to 86 are stored in a database or a library which is comprised in the computer program 16.

The first graphic user interface 50 also comprises a working field 88. During the creation of a user program 38, new software components can be created by the programmer using this working field 88.

A first new software component which is to be created and which is embodied as an elementary component is denoted by reference number 90. A number 92 of aspect blocks are provided for the first new software component 90 to be created. An aspect block is provided by adding the corresponding aspect blocks 76-86, comprised in the aspect block field 72, using a drag & drop function of the new software component to be created, as is illustrated by means of the arrow 94. In this example, a copy 96 of the selected aspect block 80 is created. In terms of programming technology, a memory area, in which the functionality or the properties which are predefined by the selected aspect block 80 are stored, is provided in this process. At this point it is to be noted that this technical programming relationship also applies in a corresponding manner to subsequent statements regarding the creation of a copy of an aspect block and/or the creation of a copy of a software component.

Those logic variables and/or those intermediate variables and/or those parameters and/or those signals which are to be fed to the respective aspect block for processing via associated inputs or which are determined by the respective aspect block and output via associated outputs, are to be defined for the provided number 92 of aspect blocks. This defining process can be carried out, for example, by means of assignments, which are input using a textural programming language in an input field 98. In this stage, the variables and/or parameters and/or signals are only defined in a basic way. The definition of the specific sensors and/or actuators which are to be connected to the respective aspect block is carried out in a later step which is to be described later.

Each aspect block comprises logic inputs and logic outputs. At least some of these logic inputs and at least some of these logic outputs are to be connected to one another and/or to logic inputs and/or to logic outputs which the first new software component 90 has. This is indicated by way of example with a connection 100. These connections can, for example, be generated graphically by drawing lines. The fact that no connections are represented between an aspect block and the first new software component 90 is not intended to have a restrictive effect. For reasons of clarity, the logic inputs have not been represented.

In addition, a function program is to be respectively created for at least some of the provided number 92 of aspect blocks. By using one of the languages described in European Standard IEC/EN 61131 it is possible for this to be respectively done by inputting corresponding instructions in the programming field 98.

Once the first new software component 90 has been created, i.e. all the steps necessary for creating this software component have been carried out, this software component is encapsulated and a newly created software component 66 is placed in the software component field 52, which is indicated by an arrow 102. Said software component 66 can then be provided in a provision field 104, to be described below, and this is indicated by an arrow 106. A copy 108 of the newly created software component 66 is placed in the provision field 104. In terms of programming technology this means that a memory area is reserved in which the functionality or the properties which are predefined by the newly created software component 66 are stored.

As an alternative to the sequence represented by the arrows 102, 106, it is conceivable for the created first new software component 90 to be provided directly in the provision field 104, and not to be transmitted firstly into the software component field 52 or placed therein. After the first new software component 90 has been provided, a newly created software component 66 can then be placed in the software component field 52, if this is desired by the programmer of the user program.

Reference number 110 denotes a second new software component to be created and embodied as a group component. A number 112 of aspect blocks is provided for the second new software component 110 to be created. This is represented by way of example by an arrow 114. The procedure here corresponds to that already been described in relation to the first new software component 90. In this case, a copy 116 of the aspect block 86 is created.

In addition, a number 118 of elementary components is provided for the second new software component 110. This is indicated by an arrow 120. In this process, a copy 122 of the predefined software component 60 is created. In terms of programming technology this means that a memory area is provided in which the functionality and/or the properties specified by the predefined software component 60 are stored. Additionally or alternatively, a number 124 of group components is provided for the second new software component 110.

For the provided number 112 of aspect blocks, in each case those logic variables and/or those intermediate variables and/or those parameters and/or those signals which are required for processing in the respective aspect block and are to be fed thereto via corresponding inputs and/or which are determined by the respective aspect block and output thereby via corresponding outputs are respectively defined for the provided number 112 of aspect blocks. This is done as described in relation to the first new software component 90, for which reason reference is made to the associated statements with respect to the specific procedure and more wide ranging information.

As has already been described in relation to the first new software component 90, the provided number 112 of aspect blocks has logic inputs and logic outputs. Likewise, the provided number 118 of elementary components, the provided number 124 of group components and the second software components 110 to be created themselves respectively have logic inputs and logic outputs. However, for reasons of clarity the logic inputs and logic outputs have not been represented.

After the variables and/or parameters and/or signals have been defined, connections are subsequently created for the second new software component 110. In this context, at least some of the logic inputs and at least some of the logic outputs of the number 112 of aspect blocks are connected to one another and/or to at least some of the logic inputs and/or at least some of the logic outputs of the number 118 of elementary components and/or the number 124 of group components and/or to at least some of the logic inputs and/or to at least some of the logic outputs of this second new software component 110. In addition, at least some of the logic inputs and at least some of the logic outputs of the number 118 of elementary components and/or the number 124 of group components are connected to one another and/or to at least some of the logic inputs and/or to at least some of the logic outputs of the second new software component 110. Corresponding created connections are denoted by the reference number 126. These connections can, for example, be generated graphically by drawing lines. The fact that no connections are represented between an aspect block or a software component and the second new software component 110 and no connections are represented between an elementary component and a group component is not intended to have any restrictive effect.

A function program is respectively created for at least some of the provided number 112 of aspect blocks. This is done in a corresponding way to that described in relation to the first new software component 90.

If all the steps which are necessary to create the second new software component 110 are carried out, the latter is encapsulated and a newly created software component 70 is placed in the software component field 52, as is indicated by an arrow 128. The newly created software component 70 can then be provided in the provision field 104 during the creation of a user program, as is indicated by an arrow 130. In this context, a copy 132 of the newly created software component 70 is created. The alternative procedure which is represented in relation to the first new software component 90 can also be used in a corresponding way.

For the two new software components 90, 110 which are to be created the following applies: by defining the variables and/or parameters and/or signals which are to be fed to the individual aspect blocks and/or are to be output thereby, those variables and/or parameters and/or signals which are to be fed to those software components in which the aspect blocks are comprised and/or are to be output thereby are automatically defined. Alternatively it is also possible to provide that those variables and/or parameters and/or signals which are to be fed to a software component and/or output thereby are defined by the programmer of the user program 38 in an independent method step.

A third new software component 134 is comprised in the working field 88. Said software component 134 is embodied as an elementary component which comprises a number 136 of aspect blocks. During the creation of the third new software component 134, the predefined software component 62 is used as a basis. The predefined software component 62 is an encapsulated software component. Said component is changed into a processing mode and the third new software component 134 is placed in the working field 88. The individual aspect blocks which are comprised in the number 136 of aspect blocks, the connections between these aspect blocks and/or the connections to the third new software component 134 correspond to those such as are present in the predefined software component 62. On the basis of the processing mode, the following modifications can then be carried out: individual aspect blocks can be removed and/or added; connections between individual aspect blocks and/or connections to the third new software component 134 can be removed and/or added; modifications can be respectively carried out to function programs comprised in aspect blocks which are already present. Overall, it is therefore easily possible to create a new software component on the basis of an already present predefined software component by carrying out modifications to the software components which are already available.

The changing of the predefined software component 62 into a processing mode and the placing of the third new software component 134 is indicated by an arrow 138. If all the steps required to create the new software component 134 have been carried out, the latter is encapsulated and a newly created software component 68 is placed in the software component field 52, as is indicated by an arrow 140. The newly created software component 68 can then be provided during the creation of a user program, wherein a copy 142 of the newly created software component 68 is placed in the provision field 104, as indicated by an arrow 144. As far as the specific sequence is concerned, the alternative sequence which is described in relation to the first new software component 90 can also be considered. The illustration which is selected in FIG. 2, according to which the third new software component 134 is embodied as an elementary component, is not intended to have any restrictive effect. In a corresponding way, a new software component can also be created on the basis of an already present, predefined software component which is embodied as a group component.

During the discussion of the software component field 52 it has been assumed that the newly created software components 66 to 70 are already placed and therefore present. In contrast, during the consideration of the working field 88 it has been assumed that these components are still to be created. This does not constitute a contradiction since various procedures during the creation of a user program are described in a summarizing fashion in FIG. 2, and therefore by way of example.

During the creation of a user program 38, a plurality 146 of software components are provided. As already described and indicated by the arrows 106, 130, 144, newly created software components 66 to 70 can be provided here. Additionally or alternatively, predefined software components 56 to 62 can also be provided, as is indicated by an arrow 148. In this case, a copy 150 of the predefined software component 56 is placed in the provision field 104. In addition, a number 152 of aspect blocks are provided, which is represented by way of example by an arrow 154. A copy 156 of the aspect block 76 is placed in the provision field 104.

The user program 38 is structured hierarchically. A top hierarchy level is defined by the plurality 146 of software components. If the plurality 146 of software components comprises a software component which is embodied as a group component, the number of software components comprised in this software component defines a further hierarchy level which is below the top hierarchy level. This is the case, for example, with respect to the copy 132.

It is indicated by means of dashed lines that some of the plurality 146 of software components and some of the number 152 of aspect blocks can be combined to form a new software component 158. This is a measure for reducing the complexity which is achieved in the hierarchy level under consideration. If such a combined software component 158 is created in the top hierarchy level, this defines a new top hierarchy level below which the previous hierarchy level is the hierarchy level which is second from the top.

The fact that the creation of a combined software component is described in relation to the top hierarchy level is not intended to have a restrictive effect. It is therefore possible for a combined software component also to be created in a hierarchy level which is below the top hierarchy level. In this case, the provision field 104 then does not comprise the software components and aspect blocks of the top hierarchy level but rather those of the hierarchy level under consideration. It is therefore possible to use the new method to create a user program 38 both according to the top-down concept as well as according to the bottom-up concept. On the basis of the conception of the new method and of the new device it is also possible for these two concepts to be mixed during the creation of a user program.

An aspect block can also be added to any hierarchy level. For example, this is necessary during the creation of a combined software component. This may concern, for example, an aspect block which is assigned to that control aspect which represents the partial aspect of locking. Not just an aspect block but also a software component can be inserted at any hierarchy level of the user program, in order to bring about a reduction in the complexity.

The illustration selected in FIG. 2 is not intended to have any restrictive effect. Therefore, instead of the selected combined arrangement of the individual fields 52, 72, 88, 98, 104 it is also possible for each of said fields to be arranged in a separate graphic user interface or for any subsidiary combination to be respectively arranged per se in a separate graphic user interface. It is also possible to provide that the newly created software components 66 to 70 are comprised in a separate software component field. The illustration which is selected for the working field 88, according to which three new software components 90, 110, 134 are processed in parallel, is not intended to have a restrictive effect. For example, these three new software components can also be created in chronological succession, and therefore individually, by means of the working field 88.

Figure 3:
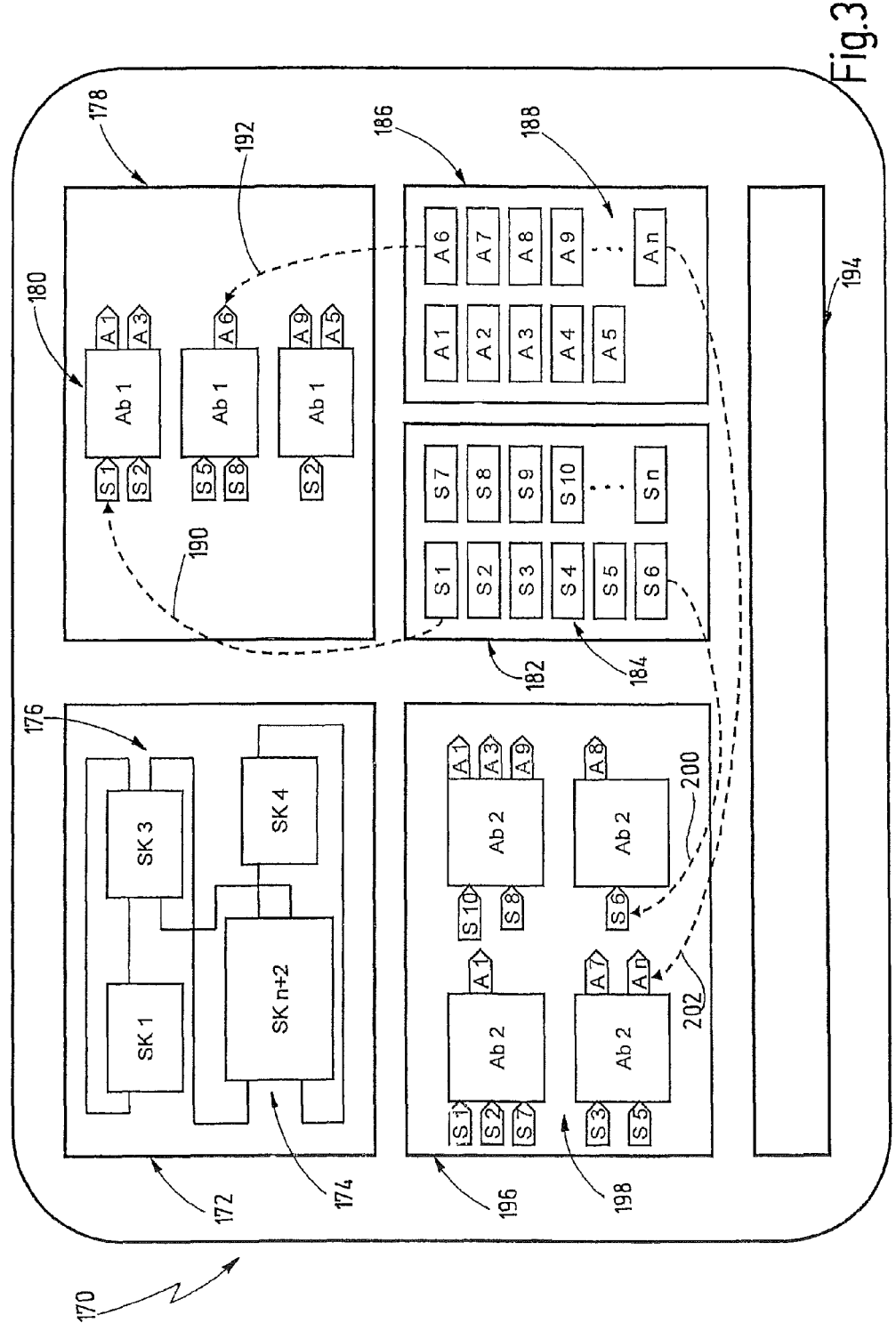
FIG. 3 shows a simplified illustration of a second graphic interface for creating a component subprogram and aspect subprograms.

In FIG. 3, a second graphic user interface is denoted in its entirety by the reference number 170.

The second graphic user interface 170 comprises a component field 172 in which a provided plurality 174 of software components are arranged. These are the software components of the top hierarchy level. A component subprogram is created by logic combination of the plurality 174 of software components. For this purpose, at least some of the logic inputs and at least some of the logic outputs of the software components are connected to one another, which is represented by a plurality 176 of connections. On the basis of the internal logic combinations which are respectively comprised in the software components, the elementary components and/or group components which are arranged in the software components are automatically also combined. Consequently, it is sufficient, during the creation of the component subprogram, to logically combine the software components which are comprised in the top hierarchy level. Software components which are comprised in hierarchy levels below this do not need to be explicitly taken into account. The logic combinations for the aspect blocks which are comprised in the top hierarchy level can, for example, be implemented in the provision field 104. Alternatively, this can also be carried out in a further independent field, wherein such a field has not been illustrated for reasons of clarity. Overall, at least some of the logic inputs and at least some of the logic outputs of the aspect blocks are connected to one another and/or to at least some of the logic inputs and/or at least some of the logic outputs of the provided software components. As a result, the creation of the component subprogram also comprises, in addition to the logic combinations of the software components described above, the logic combination of the aspect blocks described above. During the logic combination of the aspect blocks, logic combinations between logic inputs and logic outputs of software components are also implemented, in particular, as a result of the combination of logic inputs and/or logic outputs of aspect blocks, on the one hand, with logic inputs and/or logic outputs of software components, on the other, and consequently logic inputs and logic outputs of software components are connected to one another.

The provision of a plurality of software components for the plurality of hardware components does not mean that in this context only software components which correspond to hardware components which each comprise at least one sensor and at least one actuator are provided. Such software components which do not simultaneously comprise at least one sensor and at least one actuator can also be provided. For example, software components which correspond to a safety-related sensor, in particular an emergency off button, are also provided.

The second graphic user interface 170 also comprises a first aspect field 178. A plurality 180 of aspect blocks are arranged in this first aspect field 178. Each of said aspect blocks is assigned to the same control aspect. The exemplary embodiment is to be the standard operational control aspect which represents the partial aspect of standard control. The plurality 180 of aspect blocks comprises the aspect blocks which are comprised in all the hierarchy levels of the user program 38 and which are assigned to the standard operational control aspect, specifically independently of whether they are comprised independently in one of the hierarchy levels or as part of a software component.

The second graphic user interface 170 also comprises a sensor field 182. A plurality 184 of graphic sensor symbols is arranged in this sensor field 182. The sensor field 182 comprises an associated graphic sensor symbol for each sensor which is comprised in the system to be controlled. The plurality 184 of graphic sensor symbols represent both the sensors comprised in the system to be controlled, in respect of the safety control aspect as well as the sensors comprised in the system to be controlled, in respect of the standard operational control aspect. The second graphic user interface 170 comprises an actuator field 186 as a further field. A plurality 188 of graphic actuator symbols are arranged in this actuator field 186. For each actuator which is comprised in the system to be controlled, the actuator field 186 comprises an associated graphic actuator symbol. The plurality 188 of graphic actuator symbols comprise both the actuators which are comprised in the system to be controlled, in respect of the safety control aspect as well as the actuators comprised in the system to be controlled, in respect of the standard operational control aspect.

For the plurality 180 of aspect blocks which are comprised in the first actuator field 178, an aspect subprogram is created. For this purpose, what is referred to as an I/O mapping is implemented for some of the aspect blocks comprised in the first aspect field 178 both for their inputs and for their outputs. This means that at least some of the signal inputs are assigned to those sensors whose sensor signals are processed in the respective aspect block. This is represented, by way of example, by an arrow 190. Furthermore, at least some of the signal outputs are assigned actuators which are driven by output signals determined in the respective aspect block. This is represented by way of example by an arrow 192. Alternatively, the I/O mapping can be carried out by textual inputs in an input field 194. It is conceivable as a further alternative also to implement the I/O mapping by drawing lines between the individual aspect blocks and individual graphic sensor symbols or graphic actuator symbols.

During the creation of the aspect subprogram, the parameterization of the aspect blocks can also be carried out simultaneously. In this context, parameter values for those parameters which are used in the respective function programs which are comprised in the respective aspect blocks can be predefined for individual aspect blocks. The parameter values can be predetermined by means of textual inputs in the input field 194.

The second graphic user interface 170 also comprises a second aspect field 196. A plurality 198 of aspect blocks are arranged in the second aspect field 196. In the exemplary embodiment, these aspect blocks are assigned to a safety control aspect which represents the partial aspect of safety controller. An aspect subprogram is also created for these aspect blocks. This means that an I/O mapping, such as is illustrated, by way of example, by arrows 200, 202, is carried out for these aspect blocks. Details on this can be found in the statements relating to the first aspect field 178. With respect to the parameterization which should also be carried out if appropriate, reference is made to the statements relating to the first aspect field 178.

It is also conceivable that aspect blocks which are assigned to a first control aspect and aspect blocks which are assigned to a second control aspect are taken into account simultaneously during the creation of an aspect subprogram.

At this point the following is to be noted: in the statements relating to FIG. 3 it was assumed that the corresponding units for the entire system to be controlled, i.e. for all the hierarchy levels, are arranged in the fields 178, 182, 186. This is not intended to have a restrictive effect. If, for example, during the creation of an aspect subprogram only one hierarchy level is taken into account, only the units which are comprised in this hierarchy level can be arranged in the fields 178, 182, 186.

Figure 4:
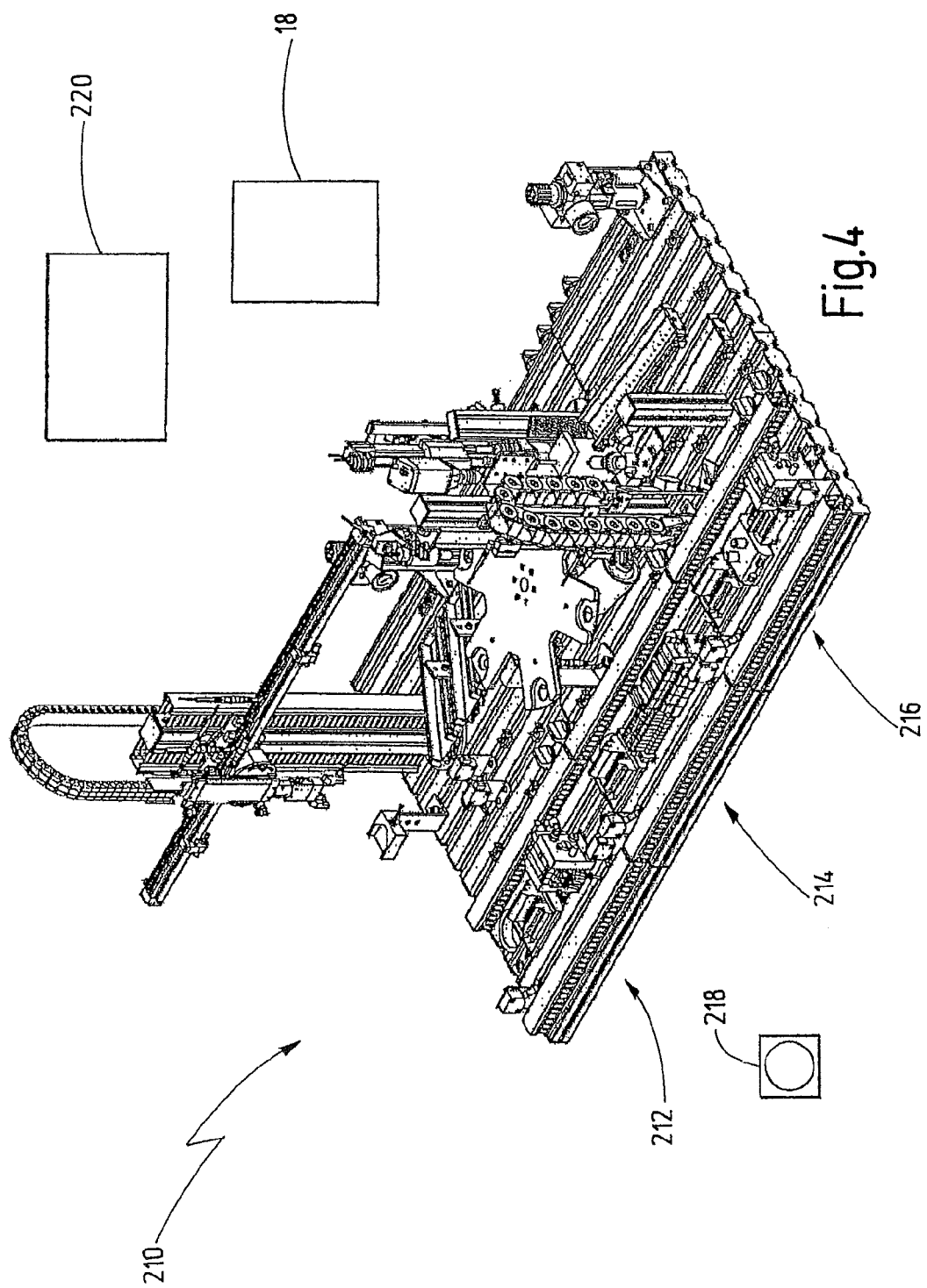
FIG. 4 shows a schematic illustration of a system which is to be controlled by the user program which is to be created.

In FIG. 4, an example of a system to be controlled is denoted in its entirety by the reference number 210. The system 210 to be controlled is composed of three partial areas, namely a handling station 212, a process station 214 and a test station 216. By means of the handling station 212, the process station 214 is loaded with workpieces. These workpieces are processed in the process station 214. The processed workpieces are then passed on by the handling station 212 to the test station 216 in which it is checked whether a processed workpiece fulfills corresponding check criteria. If these checks are passed, the process station 214 can be loaded again with a new workpiece to be processed. Furthermore, the system 210 to be controlled has an emergency off button 218 with which the system 210 to be controlled can be switched off and placed in a failsafe state. Furthermore, FIG. 4 illustrates a display unit 220 with which, for example, diagnostic data or information about the state of the system 210 to be controlled can be displayed. The system 210 is controlled by the safety controller 18.

FIG. 5a illustrates those software components and aspect blocks for the system 210 to be controlled which are comprised in the top hierarchy level.

Overall, a plurality 230 of software components is provided for the system 210 to be controlled, these being, in particular, the following software components: a first software component 232 which corresponds to the emergency off button 218 and is embodied as an individual component. A second software component 234 which corresponds to the handling station 212. A third software component 236 which corresponds to the process station 214. A fourth software component 238 which corresponds to the test station 316. Wherein the software components 234, 236, 238 are each embodied as a group component. As well as a fifth software component 240 which is assigned to the display unit 220 and which is embodied as an elementary component. Each of the provided software components 234, 236, 238 corresponds to a real mechatronic component which is present in the system to be controlled.

The first software component 232 is connected via a first logic connection 242 to the second software component 234, to the third software component 236 and to the fourth software component 238. As long as the emergency off button 218 is not activated, the first software component 232 outputs an enable signal which is fed via the first logic connection 242 to the connected software components 234, 236, 238. This enable signal releases these software components and permits operation of the system 210 to be controlled.

The software components 234, 236, 238 connect to one another by means of second logic connections 244. Signals which control the sequence are exchanged between the software components 234, 236, 238 via the second logic connections 244. The second software component 234 generates a signal which is fed to the third software component 236. By means of this signal, it is indicated to the process station 214 that the working steps of the handling station 212 are terminated and therefore it is possible to start the processing of the working steps of the process station 214. The third software component 236 generates a signal which is fed to the fourth software component 238. By means of this signal it is indicated to the test station 216 that the working steps of the process station 214 are ended and it is therefore possible to start the processing of the working steps of the test station 216. The fourth software component 238 generates a signal which is fed to the third software component 236. With this signal, the result which is determined at the test station 216 during a testing process of the processed workpiece is communicated to the process station 214. The third software component 236 generates a signal which is fed to the second software component 234. With this signal it is communicated to the handling station 212 whether a fault is present in the process station 214.

In addition to the plurality 230 of software components, a number 246 of aspect blocks is also represented. In particular, there is a first aspect block 248, which is assigned to a standard operational control aspect, a second aspect block 250 which is assigned to a safety control aspect, a third aspect block 252 which is assigned to a diagnostic aspect, a fourth aspect block 254 which is assigned to a visualization aspect, a fifth aspect block 256 which is assigned to a drive control aspect, and a sixth aspect block 258 which is assigned to a locking aspect. The fourth aspect block 254 is advantageously connected to the fifth software component 240. Likewise, at least some of the diagnostic messages which are generated by the third aspect block 252 can be displayed with the fifth software component 240.

Figure 5:
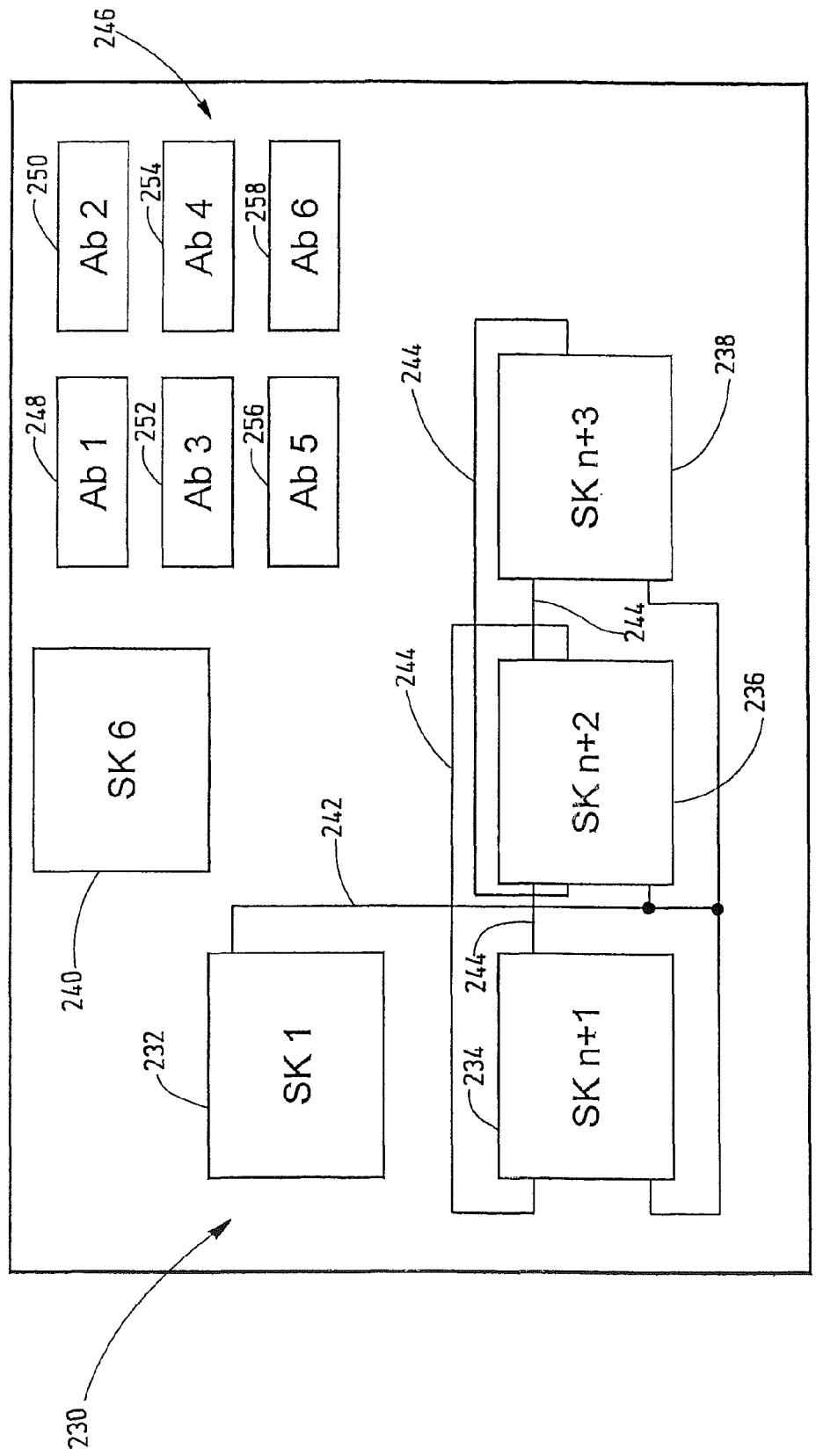
FIG. 5 shows a schematic illustration of the software components and aspect blocks which are provided for the system to be controlled in a top hierarchy level of the user program, according to a cascaded combination approach and a first control scope.

A significant advantage of the new method and of the new device will be described with reference to FIGS. 4 and 5. If the system 210 is, for example, to be modified by inserting a second process station which is identical to the process station 214 already present, just a copy of the already present software component 236 which corresponds to the process station 214 has to be inserted in the top hierarchy level of the user program 38, and correspondingly logically connected thereto. It is therefore possible that a software component which is present can also be re-used completely at one of the higher hierarchy levels. As a result, existing user programs can be very efficiently adapted. It is assumed here that the handling station 212 is mechanically embodied in such a way that it can operate both process stations. For the expanded movement scope of the handling station 212, if appropriate modifications in the function programs which are comprised in the software component 234 are necessary.

Figure 6:
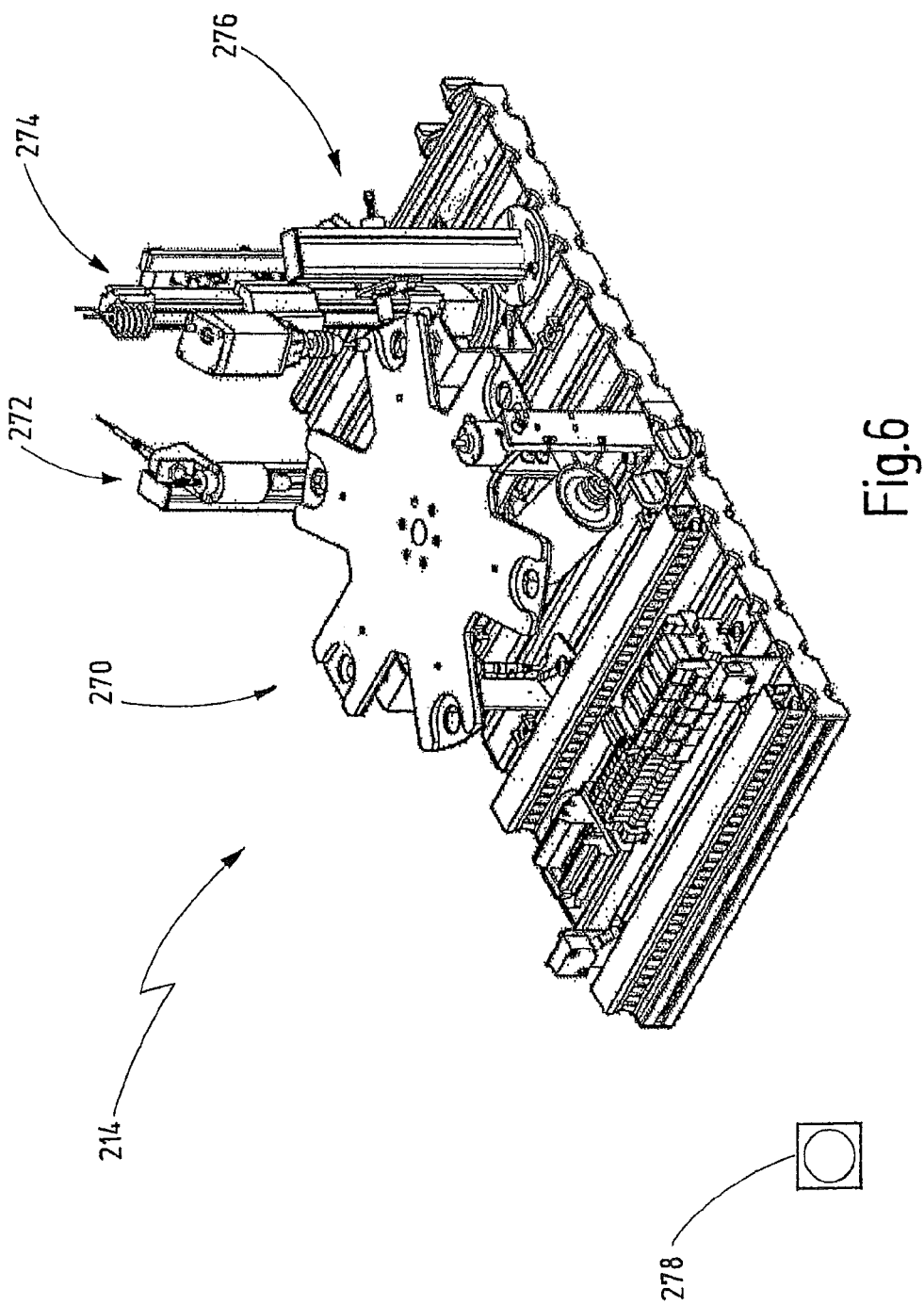
FIG. 6 shows a schematic illustration of a secondary component of the system to be controlled.

In FIG. 6, the partial component of the process station is denoted in its entirety by the reference number 214. The fact that only the process station and the hardware components which are comprised therein are to be considered subsequently is not intended to have a restrictive effect. The following statements also apply correspondingly to the handling station 212 and to the test station 216.

The process station 214 comprises a round table 270, a test module 272, a drilling module 274 and an ejection module 276. With the round table 270 it is possible to transport all the workpieces between the individual modules 272, 274, 276 in the process station 214. With the test module 272, workpieces which are to be processed are checked for the presence of predefined properties. The workpieces which are located in the process station 214 are processed with the drill module 274. The processed workpieces are removed with the ejection module 276 and passed on to the test station 216. Alternatively, the processed workpieces can also be transferred with the handling station 212. The process station 214 is assigned an emergency off button 278.

Figure 7:
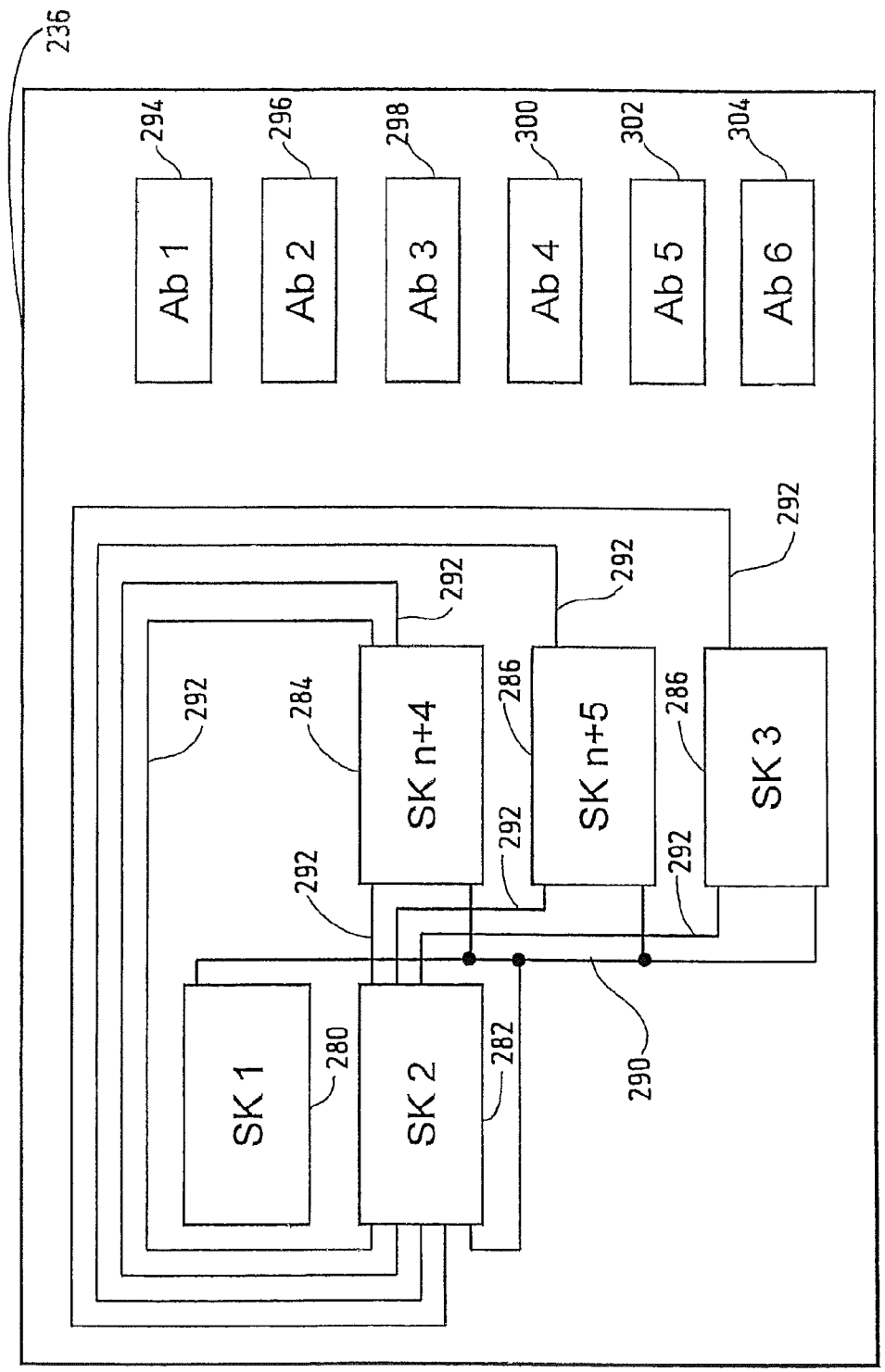
FIG. 7 shows a schematic illustration of the software components and aspect blocks which are provided for the secondary component, according to a cascaded combination approach and a first control scope.

The software components and aspect blocks which are comprised in the third software component 236 are illustrated in FIG. 7a.

The reference number 280 denotes a sixth software component which corresponds to the emergency off button 278 and which is embodied as an elementary component. The reference number 282 denotes a seventh software component which corresponds to the round table 270. The reference number 284 denotes an eighth software component which corresponds to the test module 272. The reference number 286 denotes a ninth software component which corresponds to the drilling module 274. The reference number 288 denotes a tenth software component which corresponds to the ejection module 276. Software components 282, 284, 286, 288 are embodied as group components.

An enable signal which is generated in the sixth software component 280 is fed to the software components 282, 284, 286, 288 via a logic connection 290. For details of the enable signal, reference is made to the description relating to FIG. 5a. The software components 282, 284, 286, 288 are connected to one another via fourth logic connections 292. A sequencing controller is implemented by means of corresponding signals which are exchanged between the software components 282, 284, 286, 288 via the fourth logic connections 292. Three signals, of which one is respectively fed to the eighth software component 284, one to the ninth software component 286 and one to the tenth software component 288, are generated in the seventh software component 282. These signals indicate the respective hardware component to which the respective software component corresponds so that the round table 270 assumes in each case a defined position. In each of the software components 284, 286, 288, a signal is generated which is fed to the seventh software component 282. These signals each indicate that the working steps which are provided for the modules 272, 274, 276 are processed. In the eighth software module 284, a further signal is generated which is also fed to the seventh software component 282. This signal represents the result of the test carried out in the test module 272. The method of operation of the round table 270 can also be influenced as a function of this result.

In addition, the third software component 236 has a plurality of aspect blocks: a seventh aspect block 294 which is assigned to the standard operational control aspect, an eighth aspect block 296 which is assigned to the safety control aspect, a ninth aspect block 298 which is assigned to the diagnostic aspect, a tenth aspect block 300 which is assigned to the visualization aspect, an eleventh aspect block 302 which is assigned to the drive control aspect, and twelfth aspect block 304 which is assigned to the locking aspect.

The meaning of the locking aspect will be explained with reference to the process station 214. For example, the interaction between the round table 270 and the drilling module 274 can easily be coordinated with the aspect block 304. A signal which is generated in the ninth software component 286 is generated in the aspect block 304. The signal is that which indicates that the drilling module 274 assumes a basic position in which the motor 310 is at such a height that the round table 270 can rotate freely. An enable signal, which is intended for the round table 270, is not generated by the aspect block 304 until this basic position signal is present. This ensures that the drilling module 274 cannot be damaged during a rotational movement of the round table 270.

Figure 8:
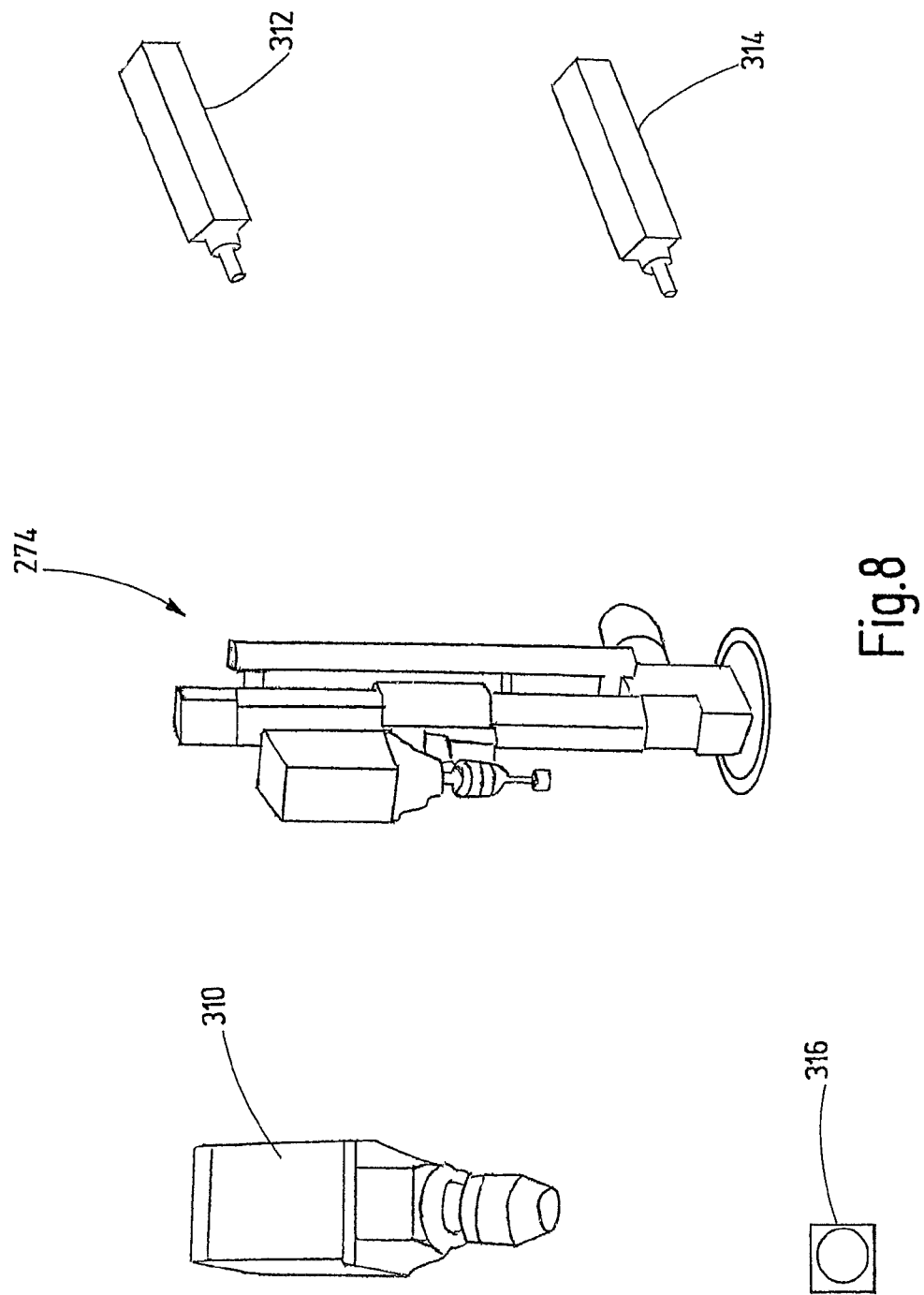
FIG. 8 shows a schematic illustration of a subsidiary component which is comprised in the secondary component, and the individual components of said subsidiary component.

In FIG. 8, the drilling module is denoted in its entirety by the reference number 274. The drilling module 274 has, as individual components with a mechanical or electrical or electro-mechanical function, a motor 310, a transfer cylinder 312 and a drilling cylinder 314. The motor 310 can be moved along a guide unit relative to the workpiece to be processed with the two cylinders 312, 314, specifically in the vertical direction with the drilling cylinder 314 and in the horizontal direction with the transfer cylinder 312. An emergency off button 316 is assigned to the drilling module 274.

Figure 9:
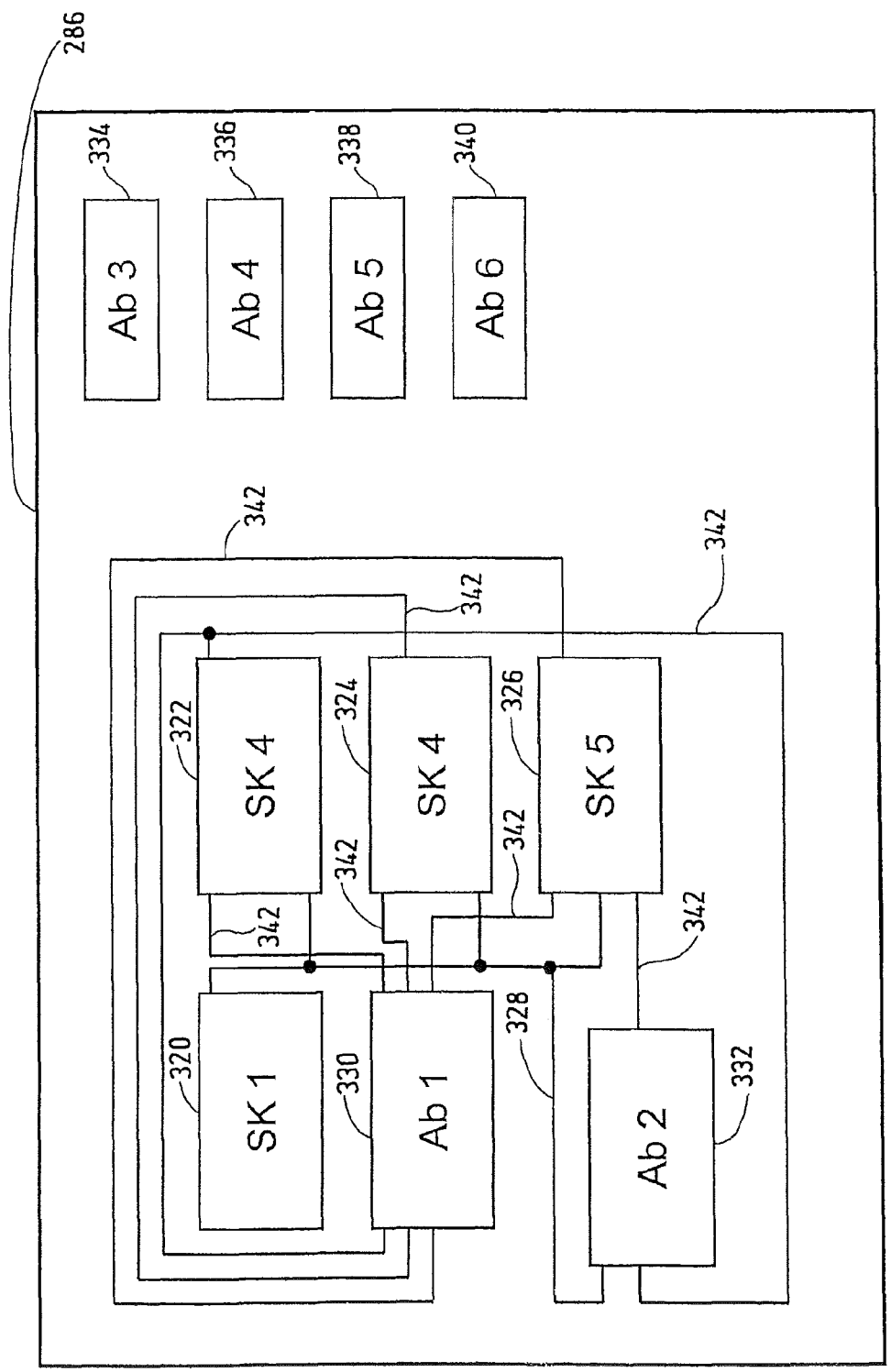
FIG. 9 shows a schematic illustration of the software components and aspect blocks which are provided for the subsidiary component, according to a cascaded combination approach and a first control scope.

The software components and aspect blocks which are comprised in the ninth software component 286 are illustrated in FIG. 9a. These are an eleventh software component 320 which corresponds to the emergency off button 316, an eleventh software component 322 which corresponds to the drilling cylinder 314, a thirteenth software component 324 which corresponds to the transfer cylinder 312 and a fourteenth software component 326 which corresponds to the motor 310. The software components 320, 322, 324, 326 are embodied as elementary components. An enable signal which is generated in the eleventh software component 320 is fed to the software components 322, 324, 326 via a fifth logic connection 328. Details on the enable signal can be correspondingly found in the description relating to FIG. 5a.

In addition, the ninth software component 286 comprises a thirteenth aspect block 330 which is assigned to the standard operational control aspect, a fourteenth aspect block 332 which is assigned to the safety control aspect, a fifteenth aspect block 334 which is assigned to the diagnostic aspect, a sixteenth aspect block 336 which is assigned to the visualization aspect, a seventeenth aspect block 338 which is assigned to the drive control aspect, and an eighteenth aspect block 340 which is assigned to the locking aspect. The enable signal is fed to the fourteenth aspect block 332 via the fifth logic connection 328.

The aspect blocks 330, 332 and the software components 322, 324, 326 are connected to one another via sixth logic connections 342.

A signal which represents the state of the drilling cylinder 314 is generated in the twelfth software component 322. This signal is fed both to the thirteenth aspect block 330 and to the fourteenth aspect block 332. Depending on the signals fed to it, the fourteenth aspect block 332 generates a signal which is fed to the fourteenth software component 326. The motor 310 can be switched on and off by means of this signal. The thirteenth software component 324 generates a signal which represents the state of the transfer cylinder 312. This signal is fed to the thirteenth aspect block 330. The fourteenth software component 326 generates a signal which represents a state of the motor 310. This signal is fed to the thirteenth aspect block 330. In the thirteenth aspect block 330, depending on the signals fed to it, these are here the three signals described above and the signal which indicates that a workpiece to be processed is located in the receptacle of the round table 270 which is located under the drilling module 274, and generates three signals representing a parameter of the maximum drilling diameter, of which one is respectively fed to the twelfth software component 322, one to the thirteenth software component 324 and one to the fourteenth software component 326. The drilling cylinder 214 is activated with the signal fed to the twelfth software component 322. The transfer cylinder 312 is activated with the signal fed to the thirteenth software component 324. The motor 310 is activated with the signal fed to the fourteenth software component 326.

Figure 10:
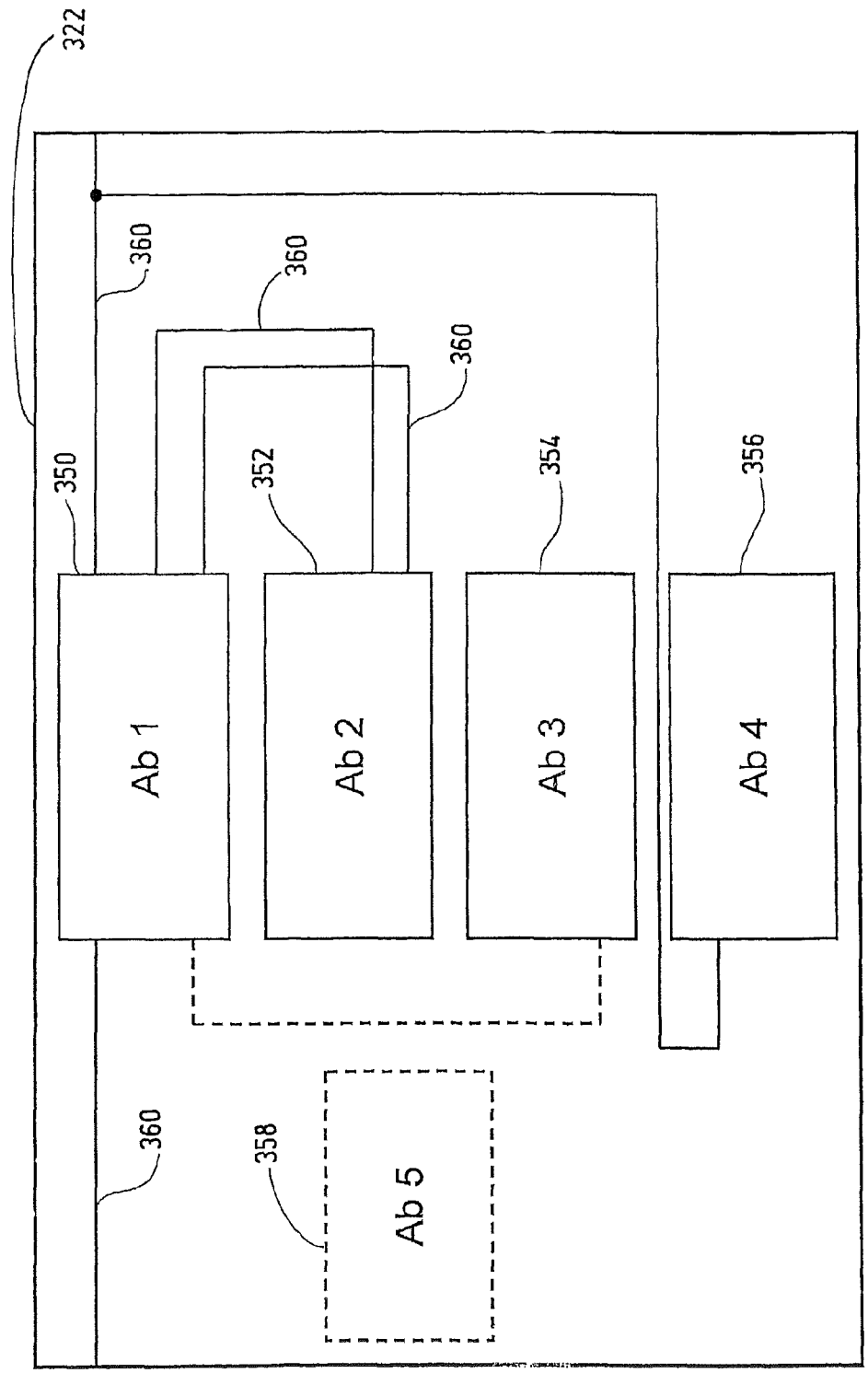
FIG. 10 shows a schematic illustration of the aspect blocks which are provided for an individual component comprised in the subsidiary component.

FIG. 10 illustrates those aspect blocks which are comprised in a software component which corresponds to a cylinder comprised in the system 210 to be controlled. In the present exemplary embodiment this is, for example, the twelfth software component 322. However, this is not intended to have a restrictive effect, and the following statements also apply to the thirteenth software component 324.

The twelfth software component 322 comprises a nineteenth aspect block 350 which is assigned to the standard operational control aspect, a twentieth aspect block 352 which is assigned to the safety control aspect, a twenty-first aspect block 354 which is assigned to the diagnostic aspect and a twenty-second aspect block 356 which is assigned to the visualization aspect. The twelfth software component can optionally also comprise a twenty-third aspect block 358 which is assigned to the drive control aspect if corresponding actuation of the drill cylinder 314 is to take place. This option is indicated by the dashed lines. Usually, an aspect block which is assigned to the drive control aspect does not have to be provided in this hierarchy level. The control tasks which relate to the drive control aspect are usually transferred from the aspect block which is comprised in the next highest hierarchy level and which is assigned to the drive control aspect.

The aspect blocks 350, 352, 354, 356 are connected to one another and to an input and to an output which the twelfth software component 322 has, via seventh logic connections 360. The nineteenth aspect block 350 is activated by means of a signal which is fed thereto from the input of the twelfth software component 322. An enable signal is fed to the twentieth aspect block 352 via a connection (not illustrated). Two end position sensors, which are preferably embodied as end position switches, are assigned as sensors to the nineteenth aspect block 350. That position of the piston at which the piston rod is extended to a maximum degree out of the cylinder housing is sensed with a first end position sensor. That end position of the piston at which the piston rod is extended to a minimum degree out of the cylinder housing is sensed with a second end position sensor.

Depending on the variables which are available in the nineteenth aspect block 350, a variable which represents the state of the drill cylinder 314 is generated therein. This variable is fed, on the one hand, to the output of the twelfth software component 322. On the other hand, this variable is fed to the twenty-second aspect block 356. Depending on this variable, a variable which represents the stroke which is set with the drill cylinder is generated in the twenty-second aspect block 356. This variable can be fed, for example, to the display unit 220 with which corresponding information can be displayed to the operator of the system 210 to be controlled.

A variable, with which the drill cylinder 314 is actuated in such a way that its piston moves into that end position at which the piston rod projects out of the cylinder housing to a minimum extent, is generated in the nineteenth aspect block 350. Furthermore, in the nineteenth aspect block 350 a second variable is generated with which the drill cylinder 314 is actuated in such a way that the piston moves into that end position at which the piston rod projects out of the cylinder housing to a maximum extent. These two variables are respectively provided at an output of the nineteenth aspect block 350.

Two variables are generated in the twentieth aspect block 352. A first variable which indicates that the inward movement of the piston into the cylinder housing is enabled for the drill cylinder 314. A second variable which indicates that the outward movement of the piston out of the cylinder housing is enabled for the drill cylinder 314. These two variables are respectively provided at an output of the twentieth aspect block 352. The variables which are respectively provided by the nineteenth aspect block and by the twentieth aspect block are combined with one another in pairs in accordance with a logic AND function. These combined variables are available at corresponding outputs of the twelfth software component 322 and are fed to the drill cylinder 314 in order to actuate it.

On the basis of the illustration in FIG. 10 it becomes clear that the overall functionality which is inherent to the drill cylinder 314 and the overall functionality which characterizes it are decomposed into the four partial aspects of standard controller, safety controller, diagnostics and visualization. The drill cylinder 314 can therefore be respectively considered separately under one of these four partial aspects. Since all the software components which are used in the user program are constructed according to this principle, the user program can be created separately according to individual control aspects, which can be done using the aspect subprograms.

The dashed connection between the two aspect blocks 350 and 354 represents a data exchange which takes place between these two aspect blocks, involving output data or internal data. Such a data exchange can also take place between individual aspect blocks which are comprised in figures which have already been described above or which are to be described below. However, a corresponding illustration has not been given in these figures for reasons of clarity.

Figure 11:
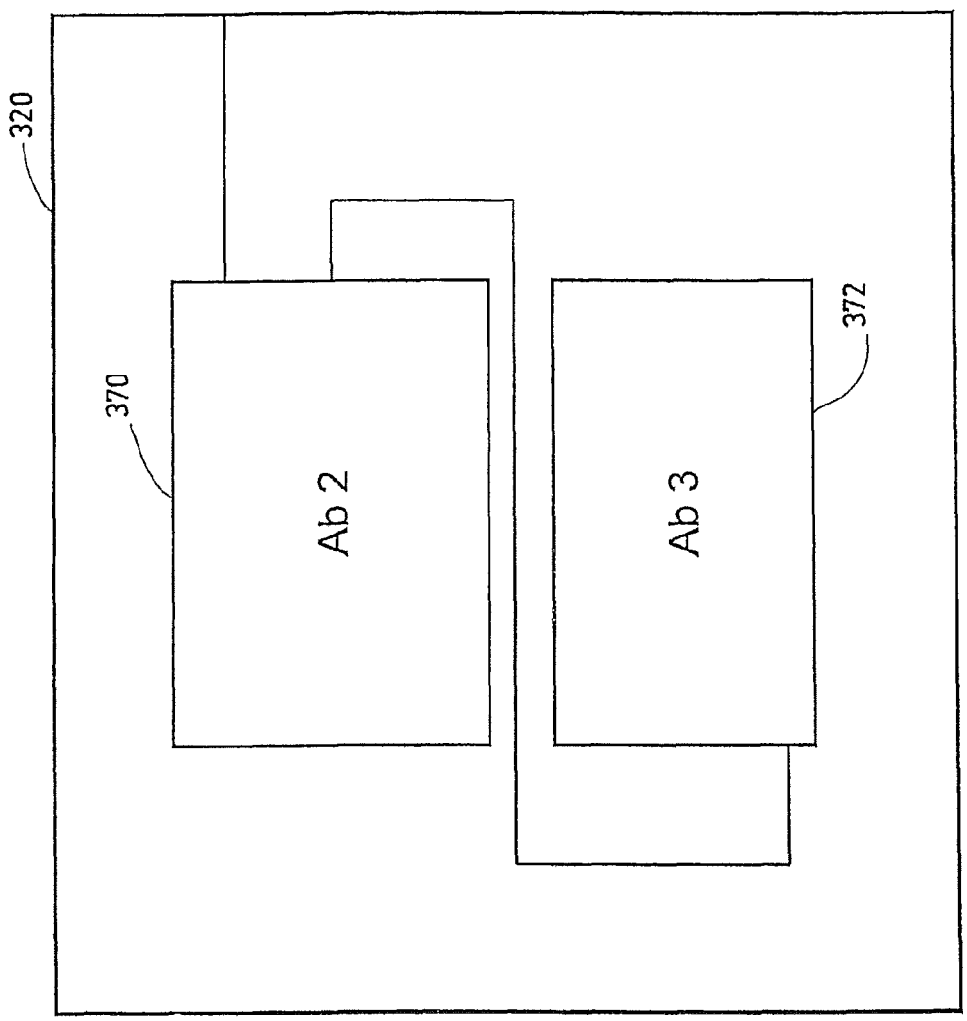
FIG. 11 shows a schematic illustration of the aspect blocks which are provided for an emergency off button.

FIG. 11 illustrates those aspect blocks which are comprised in a software component which corresponds to an emergency off button. For example, this can be the eleventh software component 320 which corresponds to the emergency off button 316. This is not intended to have any restrictive effect. This can also be another software component which is comprised in the present exemplary embodiment and which corresponds to an emergency off button.

The eleventh software component 320 has a twenty-forth aspect block 370 which is assigned to the safety control aspect. In addition, this software component has a twenty-fifth aspect block 372 which is assigned to the diagnostic aspect. An enable signal, which is fed to an output of the eleventh software component 320, is determined in the twenty-fourth aspect block 370 as a function of the variables fed thereto. Furthermore, a signal which represents the state of the emergency off button 316 is generated in the twenty-fourth aspect block 370. This signal is fed to the twenty-fifth aspect block 372 and is therefore available for diagnostic purposes. Additionally or alternatively, the enable signal which is generated by the twenty-forth aspect block 370 can be fed to the twenty-fifth aspect block 372. For example, the following system states of the emergency off button 316 can be detected in the twenty-fifth aspect block 372: the emergency off button is pressed; the contacts of the emergency off button are stuck; the two output signals of the emergency off button are synchronized.

The software component 320 is preferably provided with a functionality parameter which is stored in the twenty-forth aspect block 370. One of a plurality of stored functionalities can now be activated with this functionality parameter. If the emergency off button 316 has an acknowledge input, a functionality which maps an acknowledge input can be activated by defining a corresponding functionality parameter value. In this case, an acknowledge input is evaluated and therefore an acknowledge signal which is present at it is detected for further evaluation. On the other hand, if the emergency off button 316 has an acknowledge input, a functionality which does not involve mapping of an acknowledge input can be activated by defining a corresponding functionality parameter value. In this case, an acknowledge input is not evaluated.

As is apparent from FIGS. 10 and 11, at least some of the software components and/or aspect blocks which are comprised in a software component which is embodied as a group component are connected to inputs and/or outputs of the software components. For reasons of clarity, corresponding connections have not been illustrated in FIGS. 7a, 7b, 7c, 9a, 9b and 9c, but this is not intended to have any restrictive effect.

Figure 12:
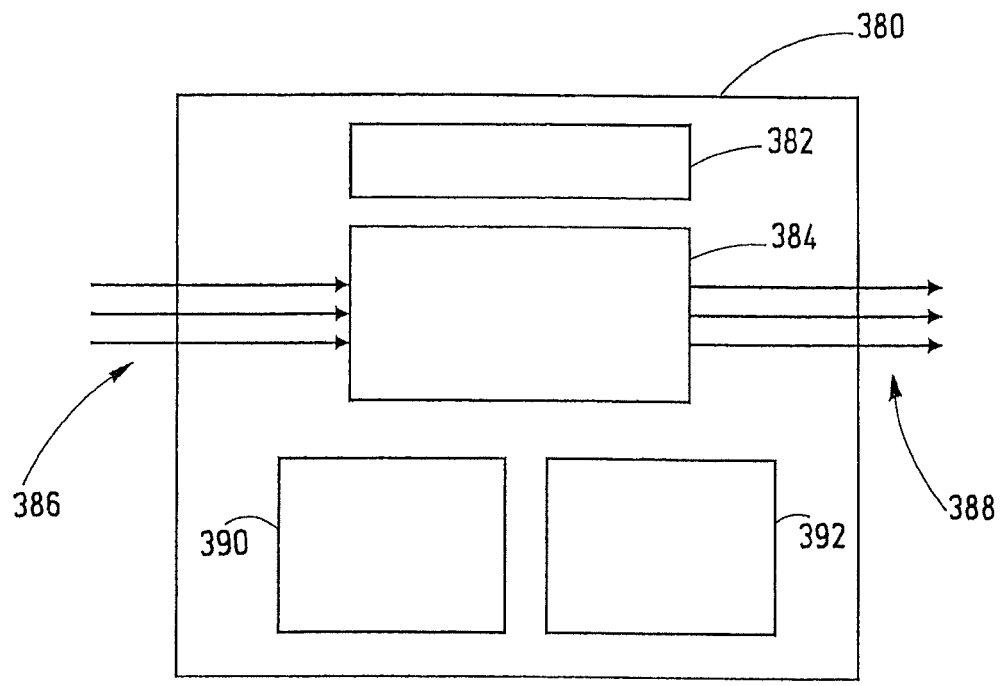
FIG. 12 shows a schematic illustration of the basic structure of an aspect block.

FIG. 12 illustrates the schematic structure of an aspect block which is denoted in its entirety by the reference number 380.

The aspect block 380 has an identifier unit 382 in which an identifier is stored which defines that control aspect to which the aspect block is assigned. The aspect block 380 also has an interface unit 384 in which a number 386 of inputs and a number 388 of outputs are combined. As indicated in FIG. 12, the number 386 of inputs comprises three different types of inputs: a first type of inputs via which logic variables and/or intermediate variables can be fed to the aspect block 380; a second type of inputs via which parameters can be fed to the aspect block 380; and a third type of inputs via which sensor signals can be fed to the aspect block 380. Likewise, the number 388 of outputs comprises three types of outputs: a first type of outputs via which logic variables and/or intermediate variables can be output by the aspect block 380; a second type of outputs via which parameters can be output by the aspect block 380, and a third type of outputs via which output signals can be output by the aspect block 380.

In addition, the aspect block 380 comprises a function unit 390 in which a function program is stored, with which function program an aspect property is defined, of that hardware component to which that software component corresponds, in which the aspect block is comprised. Furthermore, the aspect block 380 comprises a parameter unit 392 in which parameter values are stored for parameters which are processed in the function program. The blocks comprised in the aspect block 380 have not been combined for reasons of clarity.

The function program which is stored in an aspect block which is assigned to the diagnostic aspect comprises the diagnostic conditions which are to be evaluated. Furthermore, this function program comprises those texts which are to be displayed as messages and remedies depending on the result which is obtained during the evaluation of the diagnostic conditions. The function program which is stored in an aspect block which is assigned to the visualization aspect comprises those scopes of the user program which define the control of a graphic interface. For example, data obtained during the processing of the user program or states which occur at hardware components are displayed by means of a graphic interface using a monitor or display. The function program which is stored in an aspect block which is assigned to the standard operational control aspect defines those control tasks which are to be processed within the scope of the standard controller, specifically for that hardware component to which that software component corresponds in which the aspect block is comprised. Correspondingly, the control tasks which are to be processed within the scope of the safety controller are defined in the function program which is stored in the aspect block which is assigned to the safety control aspect.

As is apparent from the statements above, the output signals which are determined as a function of the input signals are not necessarily output signals in the technical control sense, in which case output signals are to be understood in the technical control sense being output signals with which an actuator, for example a motor, a cylinder or a contact breaker, is driven. For example, the output signals of an aspect block which is assigned to the visualization aspect are not output signals in the technical control sense. For example, these output signals define how an image represented on a graphic display looks or how information is represented. Likewise, the output signals of an aspect block which is assigned to the diagnostic aspect are not output signals in the technical control sense. In contrast, the output signals of an aspect block which are assigned to the standard operational control aspect or the output signals of an aspect block which are assigned to the safety control aspect are control signals in the technical control sense. As already stated, parameter values are stored in the parameterizing unit 392. The parameterization which is to be carried out for this purpose is usually carried out at the project planning time, i.e. when the user program is created. In this context, on the one hand the input can be defined via which a parameter can be fed to the aspect block, and therefore basically the parameter is defined. On the other hand, the value of the parameter is also defined. Usually, the parameter value then remains unchanged during the processing of the user program. In this case, owing to the non-variable parameter value it is not necessary to provide an output in the interface unit via which the parameter can be output. However, the following approach is conceivable, in which an interface unit is used which has outputs via which parameters can be output: a plurality of prescriptions, which are usually created at the project planning time, are stored in a user program. These prescriptions differ from one another in that at least some of the parameters used in the user program are assigned different values in the individual prescriptions. Consequently, different parameter values can be stored for one and the same parameter in a parameterizing unit of an aspect block. The user program comprises a number of test conditions with which it is determined which of the stored prescriptions is to be currently processed. If it is detected during the processing of the user program that such a test condition is met, switching over occurs between the individual prescriptions. A currently processed prescription is replaced by a prescription which is to be processed in future. Accordingly, that parameter value which is currently assigned to a parameter is replaced by a parameter value which will apply in future. The parameter value which is changed in this way can be output via a parameterizing output and therefore made available to other aspect blocks or software components. This means that various parameter sets can be provided in accordance with the individual stored prescriptions, and it is therefore possible to switch over between different parameterizations. With this approach, a parameter value can therefore change during the processing of the user program.

Figure 13:
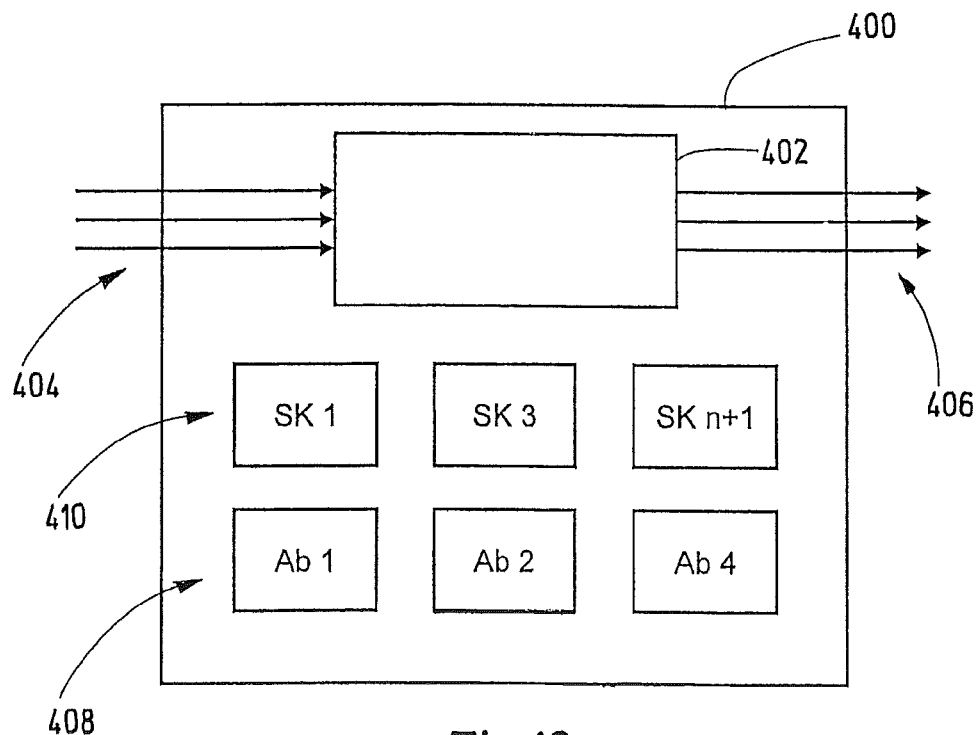
FIG. 13 shows a schematic illustration of the basic structure of a software component.

In FIG. 13, a software component is denoted in its entirety by the reference number 400.

The software component 400 comprises an interface unit 402 in which a number 404 of inputs and a number 406 of outputs are combined. As in the case of the aspect block 380 described in FIG. 12, the number 404 of inputs also comprise three types of inputs, and the number 406 of outputs also comprise three types of outputs. As far as the details on the three types of inputs and the three types of outputs are concerned, reference is made to the description of FIG. 12. In addition, the software component 400 comprises a number 408 of aspect blocks and a number 410 of elementary components and/or group components. The blocks comprised in the software component 400 have not been combined for reasons of clarity. Advantageously, a software component comprises an aspect block which is assigned to the standard operational control aspect, an aspect block which is assigned to the safety control aspect and an aspect block which is assigned to the diagnostic aspect. Optionally, an aspect block which is assigned to the visualization aspect and an aspect block which is assigned to the drive control aspect can also be provided. The enumeration above of aspect blocks comprised in a software component is exemplary and therefore does not have any exhaustive character. In addition, the illustration selected in FIG. 13, according to which the software component 400 comprises a number 410 of elementary components and/or group components, is not intended to have a restrictive character. On the basis of the illustrations selected in FIG. 13, the software component 400 corresponds to a group component. An elementary component, however, only comprises at least one aspect block and no elementary components and/or group components.

In technical programming terms, both a software component and an aspect block correspond to an XML file. In the case of an aspect block, the XML file comprises the following information: assignment information which indicates which variables and/or parameters and/or sensor signals are basically assigned to the inputs and/or outputs which are combined in the interface unit; call information which represents calls which are comprised in the function program and with which software modules located in a database can be called, wherein these are software modules which correspond to the International Standard IEC/EN 61131; the function program which is stored in the respective aspect block. In the case of a software component, the information is as follows: correspondingly also assignment information; information about the software components and/or aspect blocks comprised in the software component. The hierarchical structure of the user program is also described as an XML file, with the latter comprising the following information: information about the parameterization of individual aspect blocks; information about the I/O mapping of individual aspect blocks; text modules which are comprised in individual aspect blocks which are assigned to the diagnostic aspect. Of course, for the description of the aspect blocks, of the software components and, in particular, of the hierarchical structure of the user program it is possible to use any other description language which is suitable for this purpose and which is capable of mapping a hierarchical structure.

Figure 14:
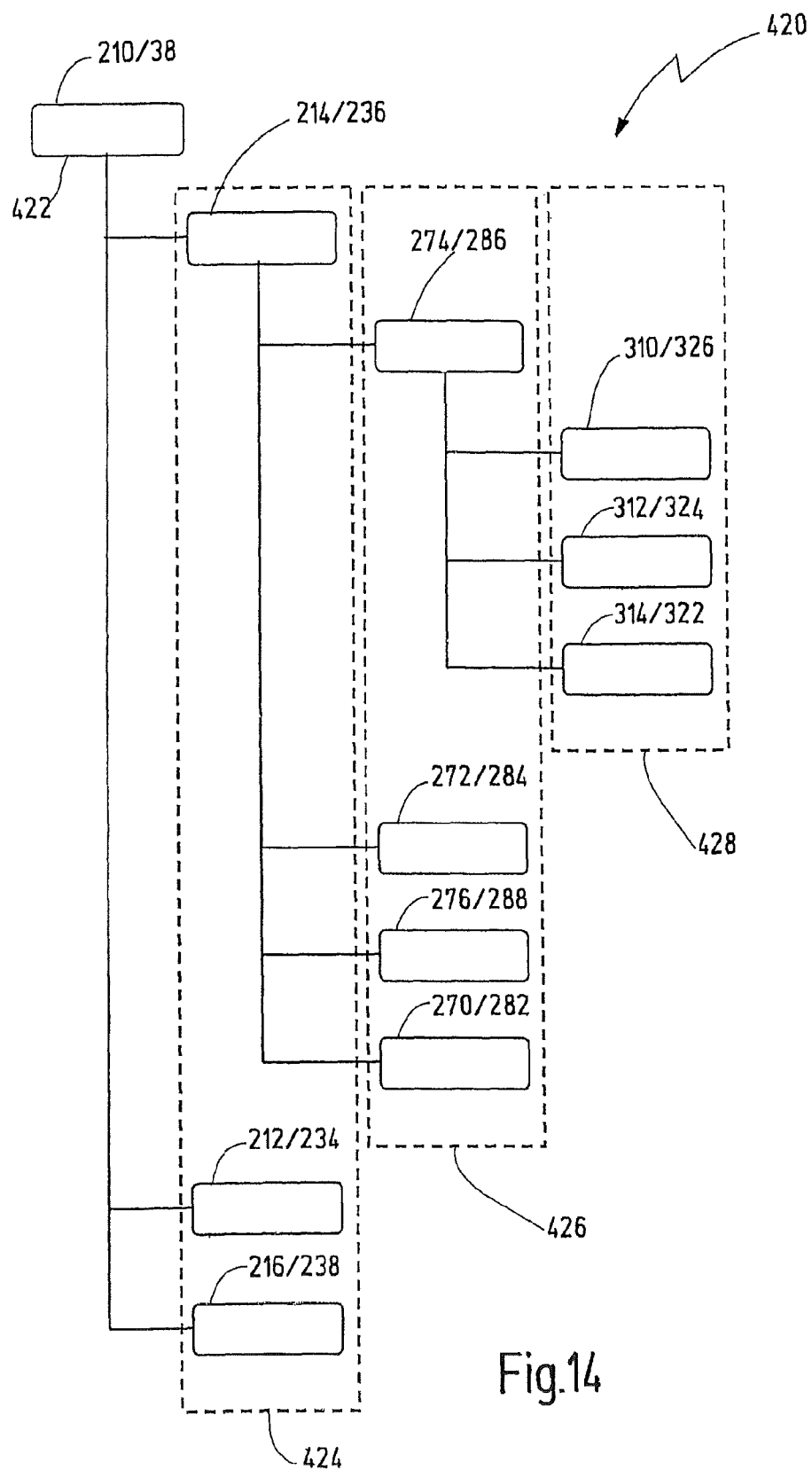
FIG. 14 shows the hierarchical structure of a created user program in an overview illustration.

In FIG. 14, a hierarchical structure is denoted in its entirety by the reference number 420.

This hierarchical structure represents both that hierarchical structure which forms the basis of the system 210 to be controlled as well as that hierarchical structure which forms the basis of the user program 38 for the safety controller 18. In the illustration selected for FIG. 14, each block has two meanings. The reference number before the oblique indicates which hardware component of the system 210 to be controlled is represented by the respective block. The reference number after the oblique indicates which software component is represented by the respective block in the user program 38. The illustration in FIG. 14 forms the basis for FIGS. 5a, 7a and 9a. This is not intended to have any restrictive effect. The structure illustrated in FIG. 14 can also be transferred to the illustration in FIGS. 5b, 7b and 9b or to the illustration in FIGS. 5c, 7c and 9c.

The reference number 422 denotes a block which represents the entirety of the system 210 to be controlled or the entirety of the user program 38. The reference number 424 denotes a top hierarchy level. With respect to the system 210 to be controlled, this hierarchy level comprises the handling station 212, the process station 214 and the test station 216. These hardware components are referred to as partial components.

The reference number 426 denotes a first hierarchy level which lies directly below the top hierarchy level. This hierarchy level comprises the round table 270, the test module 272, the drill module 274 and the ejection module 276. These hardware components are referred to as subsidiary components.

The reference number 428 denotes a second hierarchy level which lies directly below the first hierarchy level. This hierarchy level comprises the motor 310, the transfer cylinder 312 and the drill cylinder 314. These hardware components are referred to as individual components.

In FIG. 14, the first hierarchy level has not been illustrated for every secondary component illustrated, and the second hierarchy level has not been illustrated for every subsidiary component illustrated. This is not intended to have a restrictive effect. Corresponding hierarchy levels exist for each of the secondary components and subsidiary components illustrated in FIG. 14. In addition, all the emergency off buttons have not been illustrated for reasons of clarity.

With respect to the maintenance aspect the following is to be noted: for maintenance the system 210 which is to be controlled is changed into an operating mode in which the movement sequences, defined by the user program 38, of the system 210 to be controlled run at a reduced speed. As a result, for example a production process which is being carried out with the system 210 to be controlled can continue to run at a reduced speed, while at the same time maintenance work can be carried out on the system 210 to be controlled.

The exemplary embodiment is based on the system 210 to be controlled. This system 210 is controlled with a safety controller 18 in which a hierarchically structured user program 38 is run. When the user program is created, a plurality of software components and, if appropriate, aspect blocks are provided. The provided software components can be embodied either as elementary components or as group components, with a hierarchical structure occurring on the basis of the software components which are embodied as group components. Through logic combination of the software components a component subprogram is created. Within the respective group component, the software components which are comprised therein are also logically combined with one another. Existing aspect blocks can also be connected to the software components. Aspect subprograms which are related to the individual control aspects are created for the aspect blocks which are present. The component subprogram and the aspect subprograms then together produce the user program, wherein the user program constitutes a sequencing controller or a sequencing controller is carried out by said user program.

The logic connections, in particular those between the software components and also those between the software components on the one hand and the aspect blocks on the other can be implemented here according to different combination approaches. Which combination approaches specifically apply depends here on the different external conditions. Such a condition is, for example, the degree of equipment of the hardware components with data processing components, for example processors. Furthermore, the complexity of the system to be controlled or the complexity of the sequencing which is to be carried out for the system to be controlled or the sequences which are to be carried out has to be taken into account. In this context it is not necessary to use the same combination approach for all the hierarchy levels. It is conceivable to apply different combination approaches for individual hierarchy levels or even for individual group components.

In a complex system with a large number of different hardware components, in each case one aspect subprogram is advantageously created for at least the following control aspects: a standard operational control aspect for controlling the non-safety-related process sequence of the system taking into account a large part of the hardware components, a safety control aspect for controlling all the safety-related subprocesses and a diagnostic aspect for creating and visualizing diagnostic messages. Furthermore, an aspect subprogram can be created for the following aspects: drive control, cooling, access authorization, maintenance, locking, manual operation, data management. With such aspect subprograms it is possible to program the control of a complex system over a large number of different hardware components from a uniform, aspect-related point of view, in which the other aspects are "blanked out".

What is claimed is:

1. A method for creating an overall user program for a controller of an automated system comprising a plurality of hardware installations, wherein each of said hardware installations includes at least one automated machine device and a plurality of hardware components comprising a number of sensors and actuators, including the steps of:

sub-dividing the overall user program into a matrix-like organization comprising operational sub-programs and safety-related sub-programs, wherein each of the operational sub-programs is intended to operationally control one particular automated machine device, and each of the safety-related sub-programs is intended to produce a signal output as a function of at least one signal input from at least one generic type of safety sensor;

creating a separate operational sub-program for controlling the operation of each of said at least one automated machine device in each of said plurality of hardware installations;

creating a plurality of safety-related sub-programs independent of said operational sub-programs for controlling various safety-related aspects of the automated system that are common to more than one of said plurality of hardware installations, wherein each of said plurality of safety-related sub-programs includes an algorithm for processing individual signal inputs from a different generic type of safety sensor and producing output signals as a function of said input signals;

assigning a program connection between each of a particular type of safety sensor from a particular hardware installation and a signal input to one of the safety-related sub-program containing the algorithm for processing signals from said particular type of safety sensor, and a connection between the corresponding signal output from said one safety-related sub-program and an actuator from said particular hardware installation;

iteratively repeating the above assigning step for each of the other different types of safety sensors from said particular hardware installation;

iteratively repeating the above two assigning steps for each of said plurality of hardware installations; and combining the operational sub-programs with the safety-related sub-programs to form the overall user program;

wherein the safety-related sub-programs are protected against unauthorized modifications.

2. The method of claim 1, wherein the safety-related sub-programs are permanently protected against structural modification by a user.

3. The method of claim 1, wherein the plurality of subprograms are created independently from one another.

4. The method of claim 1, wherein safety-related subprograms include XML files.

5. The method of claim 4, wherein an XML file comprises assignment information indicating assignments for said signal inputs and said signal outputs, and further comprises logical interconnections between said signal inputs in order to define said signal outputs.

\* \* \* \* \*